(12) United States Patent
Mumaw et al.

(10) Patent No.: US 7,256,710 B2
(45) Date of Patent: Aug. 14, 2007

(54) METHODS AND SYSTEMS FOR GRAPHICALLY DISPLAYING SOURCES FOR AND NATURES OF AIRCRAFT FLIGHT CONTROL INSTRUCTIONS

(75) Inventors: Randall J. Mumaw, Seattle, WA (US); Daniel J. Boorman, Seattle, WA (US); William M. Bresley, Seattle, WA (US); John C. Griffin, III, Seattle, WA (US); Peter D. Gunn, Seattle, WA (US)

(73) Assignee: The Boeing Company, Chicago, IL (US)

( * ) Notice: Subject to any disclaimer, the term of this patent is extended or adjusted under 35 U.S.C. 154(b) by 435 days.

(21) Appl. No.: 10/882,800

(22) Filed: Jun. 30, 2004

(65) Prior Publication Data

US 2007/0164877 A1    Jul. 19, 2007

(51) Int. Cl.
G01C 23/00    (2006.01)
(52) U.S. Cl. .............. 340/973; 340/975; 340/979; 340/995.27; 701/14; 701/18
(58) Field of Classification Search .......... 340/970, 340/973, 975, 995.26–995.27, 959, 978, 340/980; 701/4, 5, 7, 9, 14, 18
See application file for complete search history.

(56) References Cited

U.S. PATENT DOCUMENTS

| | | | |
|---|---|---|---|
| 3,191,147 A | 6/1965 | Majendie | |
| 4,196,474 A | 4/1980 | Buchanan et al. | |
| 4,212,064 A | 7/1980 | Forsythe | |
| 4,247,843 A | 1/1981 | Miller | |
| 4,274,096 A | 6/1981 | Dennnison | |
| 4,325,123 A | 4/1982 | Graham | |
| 4,631,678 A | 12/1986 | Angermuller et al. | |
| 4,792,906 A | 12/1988 | King | |
| 4,860,007 A | 8/1989 | Konicke | |
| 5,050,081 A | 9/1991 | Abbott et al. | |
| 5,070,458 A | 12/1991 | Gilmore et al. | |
| 5,243,339 A | 9/1993 | Graham et al. | |

(Continued)

FOREIGN PATENT DOCUMENTS

DE    3315386 A    10/1984

(Continued)

OTHER PUBLICATIONS

U.S. Appl. No. 10/746,883, filed Aug. 18, 2005, Boorman.

(Continued)

*Primary Examiner*—Jeffery Hofsass
*Assistant Examiner*—Anne V Lai
(74) *Attorney, Agent, or Firm*—Perkins Coie LLP

(57) ABSTRACT

Methods and systems for graphically displaying sources for aircraft flight control instructions are disclosed. A method in accordance with one embodiment of the invention includes displaying at a display medium a map of a region at least proximate to an aircraft and displaying an aircraft indicator at least proximate to the map. The aircraft indicator can identify current location of the aircraft, and its location relative to the map can be updated as the aircraft executes a flight. The method can further include displaying at least proximate to the map an indication of a current mode by which a path of the aircraft is currently being automatically controlled.

34 Claims, 19 Drawing Sheets

U.S. PATENT DOCUMENTS

| | | | |
|---|---|---|---|
| 5,329,277 A | 7/1994 | Dougan et al. | |
| 5,337,982 A | 8/1994 | Sherry | |
| 5,416,705 A | 5/1995 | Barnett | |
| 5,420,582 A | 5/1995 | Kubbat | |
| 5,454,074 A | 9/1995 | Hartel | |
| 5,475,594 A | 12/1995 | Oder et al. | |
| 5,499,025 A | 3/1996 | Middleton et al. | |
| 5,519,392 A | 5/1996 | Oder et al. | |
| 5,523,949 A | 6/1996 | Agate et al. | |
| 5,668,542 A | 9/1997 | Wright | |
| 5,715,163 A | 2/1998 | Bang | |
| 5,739,769 A | 4/1998 | Vladimir | |
| 5,844,503 A | 12/1998 | Riley et al. | |
| 5,875,998 A | 3/1999 | Gleine | |
| 5,940,013 A | 8/1999 | Vladimir et al. | |
| 5,978,715 A | 11/1999 | Briffe | |
| 5,995,901 A | 11/1999 | Owen et al. | |
| 6,038,498 A | 3/2000 | Briffe et al. | |
| 6,057,786 A | 5/2000 | Briffe | |
| 6,067,502 A | 5/2000 | Hayashida et al. | |
| 6,072,473 A | 6/2000 | Muller et al. | |
| 6,085,129 A * | 7/2000 | Schardt et al. | 701/14 |
| 6,098,014 A | 8/2000 | Kranz | |
| 6,112,141 A * | 8/2000 | Briffe et al. | 701/14 |
| 6,118,385 A | 9/2000 | Leard | |
| 6,154,151 A * | 11/2000 | McElreath et al. | 340/970 |
| 6,175,315 B1 * | 1/2001 | Millard et al. | 340/959 |
| 6,188,937 B1 | 2/2001 | Sherry | |
| 6,246,320 B1 | 6/2001 | Monroe | |
| 6,262,720 B1 | 7/2001 | Jeffrey | |
| 6,275,172 B1 | 8/2001 | Curtis et al. | |
| 6,278,913 B1 | 8/2001 | Jiang | |
| 6,313,759 B1 | 11/2001 | Musland-Sipper | |
| 6,314,366 B1 | 11/2001 | Farmakis et al. | |
| 6,335,694 B1 | 1/2002 | Beksa et al. | |
| 6,346,892 B1 | 2/2002 | DeMers et al. | |
| 6,362,750 B1 | 3/2002 | Castor | |
| 6,381,519 B1 | 4/2002 | Snyder | |
| 6,381,538 B1 | 4/2002 | Robinson et al. | |
| 6,389,333 B1 | 5/2002 | Hansman | |
| 6,443,399 B1 | 9/2002 | Yount et al. | |
| 6,466,235 B1 | 10/2002 | Smith et al. | |
| 6,473,675 B2 | 10/2002 | Sample | |
| 6,512,527 B1 | 1/2003 | Barber et al. | |
| 6,542,796 B1 | 4/2003 | Gibbs et al. | |
| 6,556,902 B2 | 4/2003 | Ing | |
| 6,633,810 B1 | 10/2003 | Qureshi et al. | |
| 6,636,786 B2 | 10/2003 | Partel | |
| 6,668,215 B2 | 12/2003 | Lafon et al. | |
| 6,690,299 B1 * | 2/2004 | Suiter | 340/973 |
| 6,696,980 B1 | 2/2004 | Langner et al. | |
| 6,697,718 B2 | 2/2004 | Le Draoullec et al. | |
| 6,707,387 B2 | 3/2004 | Noguchi et al. | |
| 6,720,891 B2 | 4/2004 | Chen | |
| 6,745,113 B2 | 6/2004 | Griffin | |
| 6,753,891 B1 | 6/2004 | Chohan et al. | |
| 6,856,864 B1 | 2/2005 | Gibbs et al. | |
| 6,870,490 B2 | 3/2005 | Sherry et al. | |
| 6,871,124 B1 * | 3/2005 | McElreath | 701/16 |
| 6,934,608 B2 * | 8/2005 | Qureshi | 701/4 |
| 6,980,198 B1 | 12/2005 | Gyde et al. | |
| 7,030,892 B1 | 4/2006 | Gyde et al. | |
| 7,142,131 B2 | 11/2006 | Sikora | |
| 2002/0004695 A1 | 1/2002 | Glenn et al. | |
| 2002/0016654 A1 | 2/2002 | Ing et al. | |
| 2002/0033837 A1 | 3/2002 | Monro | |
| 2003/0025719 A1 | 2/2003 | Palmer et al. | |
| 2003/0058134 A1 | 3/2003 | Sherry | |
| 2003/0132860 A1 | 7/2003 | Feyereisen | |
| 2003/0225492 A1 | 12/2003 | Cope et al. | |
| 2004/0059474 A1 | 3/2004 | Boorman | |
| 2004/0095466 A1 | 5/2004 | Galasso | |
| 2004/0111192 A1 | 6/2004 | Naimer et al. | |
| 2004/0183697 A1 | 9/2004 | Rogers et al. | |
| 2004/0254691 A1 | 12/2004 | Subelet | |
| 2005/0178903 A1 | 8/2005 | Boorman et al. | |
| 2006/0004496 A1 | 1/2006 | Tucker et al. | |

FOREIGN PATENT DOCUMENTS

| | | |
|---|---|---|
| EP | 0 286 120 | 10/1988 |
| EP | 0 370 640 | 5/1990 |
| EP | 0 489 521 | 11/1991 |
| FR | 2817831 | 6/2002 |
| FR | 2848306 | 6/2004 |
| GB | 886136 | 1/1962 |
| WO | WO-02/24530 | 3/2002 |
| WO | WO-2004/027732 | 4/2004 |

OTHER PUBLICATIONS

U.S. Appl. No. 10/746,912, filed Jun. 30, 2005, Boorman.
U.S. Appl. No. 10/787,644, filed Sep. 1, 2005, Tafs et al.
U.S. Appl. No. 10/798,588, Sep. 15, 2005, Griffin, III et al.
U.S. Appl. No. 10/798,749, filled Sep. 15, 2005, Sandell et al.
U.S. Appl. No. 10/814,369, filed Oct. 6, 2005, Chen et al.
U.S. Appl. No. 10/814,494, filed Oct. 13, 2005, Gunn et al.
U.S. Appl. No. 10/815,034, filed Oct. 20, 2005, Crane et al.
777 Flight deck (1 page); http://www.meriweather.com/777/777_main.html; [Accessed Jan. 28, 2003].
Hutchins, Edwin, "The Integrated Mode Management Interface," Department of Cognitive Science, University of California, San Diego, Sep. 17, 1996.
Lindenfeld, "What is an FMS?", Flight Management Systems (5 pages); http://www.ultranet.com/~marzgold//FAQ-FMS.html; [Accessed Jun. 3, 2002].
Meriweather's Flight Deck Acronyms & Definitions (4 pages); http://www.meriweather.com/fd/def.html; [Accessed Jun. 3, 2002].
Tucker et al., "Enhanced Vertical Situation Display", filed Jun. 30, 2004, 11 pgs.
U.S. Appl. No. 10/860,760, filed Oct. 5, 2006, Sikora et al.
U.S. Appl. No. 10/881,024, filed Jan. 5, 2006, Griffin, III et al.
U.S. Appl. No. 10/882,101, filed Jan. 5, 2006, Griffin, III et al.
Painter et al., "Decision Support For the General Aviation Pilot," Systems, Man, and Cybernetics, IEEE International Conference on Computational Cybernetics and Simulation, Orlando, FL, Oct. 12-15, 1997, pp. 88-93.

* cited by examiner

METHODS AND SYSTEMS FOR GRAPHICALLY DISPLAYING SOURCES FOR AND NATURES OF AIRCRAFT FLIGHT CONTROL INSTRUCTIONS

TECHNICAL FIELD

The present invention is directed generally toward methods and systems for graphically displaying the sources for and natures of aircraft flight control instructions.

BACKGROUND

Modern commercial aircraft make extensive use of computer systems to control aircraft behavior, plan and execute flights, and display information to the pilots during flight operations. FIG. 1A illustrates an existing flight deck 40 having a forward instrument panel 46 and a control pedestal 45 configured in accordance with the prior art. Instruments 44 and display screens 43 are distributed over the forward instrument panel 46 and the control pedestal 45 for easy access by the pilots. The display screens 43 can include primary flight displays (PFDs) 41, an engine display 47, and three multi-function displays (MFDs) 49. The MFDs 49 can present additional aircraft flight information, including navigation displays 20, aircraft checklists, communication displays, and system status information.

Additional instrumentation is presented at a mode control panel (MCP) 11 positioned on a glare shield 42 of the flight deck 40, and at control and display units (CDUs) 13 positioned on the control pedestal 45. The MCP 11 can receive tactical pilot inputs for automatically controlling the target to which the aircraft is directed (e.g., inputs that are implemented when the pilot authorizes them, for example, by pressing a knob). The CDUs 13 can provide an input/output link to a flight management computer 12 that provides automatically implemented strategic targets of the flight (e.g., flight targets toward which the aircraft is directed in a manner that is initiated automatically when the aircraft achieves a particular altitude or other threshold condition, and which can form portions of a pre-determined flight plan).

When the aircraft is controlled automatically, either to targets received from the MCP 11 or the FMC 12, the instructions for controlling the aircraft often include a pre-defined mode (e.g., a pre-defined flight behavior during climb, descent, cruise, or maneuvers) and a target (e.g., an altitude target, waypoint, or directional heading). Accordingly, the instructions identify a target in space and a manner for achieving the target. The modes are typically displayed at the PFDs 41, while the planned route of the aircraft, including waypoint targets, is displayed at the navigation display 20. For example, referring now to FIG. 1B, the navigation display 20 can include a vertical situation display (VSD) which depicts altitude as a function of ground distance. An aircraft indicator 24 identifies the current location of the aircraft relative to the upcoming terrain 25. A flight path angle trend indicator 23 identifies the current trajectory of the aircraft. The display 20 can also include a current waypoint target 21a (identifying the waypoint toward which the aircraft is currently directed) and a next waypoint target 21b (identifying the next waypoint target to which the aircraft will be directed upon attaining the current waypoint target 21a). The display 20 can also include an MCP altitude window indicator 26 identifying the altitude dialed in by the pilot at the MCP 11 (FIG. 1A), and a constraint indicator 22 identifying an altitude constraint.

One characteristic of the foregoing arrangement is that the flight mode annunciators or identifiers are typically displayed at the primary flight display 41, while the route of the aircraft is displayed at the navigation display 20. Accordingly, the connection between particular modes by which the aircraft will be flown and the point at which the aircraft will begin flying in accordance with those modes may not be immediately apparent to the pilot and may require that the pilot take extra time to understand this relationship. Furthermore, the flight mode annunciators may have different meanings depending upon whether they correspond to targets received from the MCP 11, or targets received from the FMC 12. Still further meanings are possible depending on what phase of flight the aircraft is currently in (e.g., climb, descent, cruise, etc.). Instructions entered at the MCP 11 (e.g., via an MCP-based altitude knob) may also have different effects depending on the current state of the aircraft. Accordingly, it may take the pilot additional time to understand what the aircraft is currently doing, and/or what the aircraft will do when it changes from one mode to another.

The foregoing arrangement can suffer from additional drawbacks, all of which can increase the amount of time required by the pilot to understand current and upcoming aircraft behavior. For example, it may not be readily apparent to the pilot whether the aircraft will level off to meet an FMC-dictated altitude restriction, or continue along a current climb route in accordance with an MCP-dictated directive. In particular, it may not be readily apparent to the pilot where, when and how the aircraft will transition from an instruction originating from the MCP 11 to an instruction originating from the FMC 12, and vice versa.

SUMMARY

The present invention is directed generally toward methods and systems for graphically displaying sources for and natures of aircraft flight control instructions. A computer-implemented method in accordance with one aspect of the invention includes displaying at a display medium a map of a region at least proximate to an aircraft, and displaying an aircraft indicator at least proximate to the map, with the aircraft indicator identifying a current location of the aircraft. The method can further include updating a location of the aircraft indicator relative to the map as the aircraft executes a flight, and displaying at least proximate to the map an indication of a current mode by which a path of the aircraft is currently being automatically controlled.

In further aspects of the invention, the method can also include displaying a flight plan route, with the flight plan route including at least one segment to be initiated automatically when the aircraft meets a threshold condition. When the aircraft is not being automatically controlled to the flight plan route, the method can include displaying a current route to which the aircraft is being automatically controlled. The method can further include displaying an indication of where the current route will transition to the flight plan route.

A system in accordance with another aspect of the invention can include a flight guidance computer that in turn includes a first portion configured to receive instructions for flight segments to be automatically initiated upon authorization by an operator. The first portion can include an input device to receive an authorization input from the operator. The flight guidance computer can further include a second portion configured to receive and store instructions for flight segments to be initiated at future times upon meeting corresponding threshold conditions. A computer-readable medium can have contents capable of displaying a map of a region at least proximate to the aircraft, and displaying at least proximate to the map an indication of which flight mode the aircraft will enter when the operator authorizes an altitude target at the input device.

DETAILED DESCRIPTION

The following disclosure describes systems and methods for displaying aircraft control information aboard an aircraft. Certain specific details are set forth in the following description and in FIGS. 2A-10 to provide a thorough understanding of various embodiments of the invention. Well-known structures, systems, and methods often associated with handling electronic instructions have not been shown or described in detail below to avoid unnecessarily obscuring the description of the various embodiments of the invention. In addition, those of ordinary skill in the relevant art will understand that additional embodiments of the present invention may be practiced without several of the details described below.

Many embodiments of the invention described below may take the form of computer-executable instructions, such as routines executed by a programmable computer. Those skilled in the relevant art will appreciate that the invention can be practiced on other computer system configurations as well. The invention can be embodied in a special-purpose computer or data processor that is specifically programmed, configured or constructed to perform one or more of the computer-executable instructions described below. Accordingly, the term "computer" as generally used herein includes any processor and can include Internet appliances, handheld devices (including palm-top computers, cellular or mobile phones, multiprocessor systems, processor-based or programmable consumer electronics, minicomputers and the like).

The invention can also be practiced in distributed computing environments, in which tasks or modules are performed by remote processing devices that are linked with a communications network. In a distributed computing environment, program modules or subroutines may be located in both local and remote memory storage devices. Aspects of the invention described below may be stored or distributed on computer-readable media, including magnetic or optically readable computer disks (e.g., removable disks) as well as distributed electronically over networks. Data structures and transmissions of data particular to aspects of the invention are also encompassed within the scope of the invention. Information handled in accordance with aspects of the invention can be presented at displays or display media, for example, CRT screens, LCD screens, head-up displays, or other suitable devices.

Figure 1A:
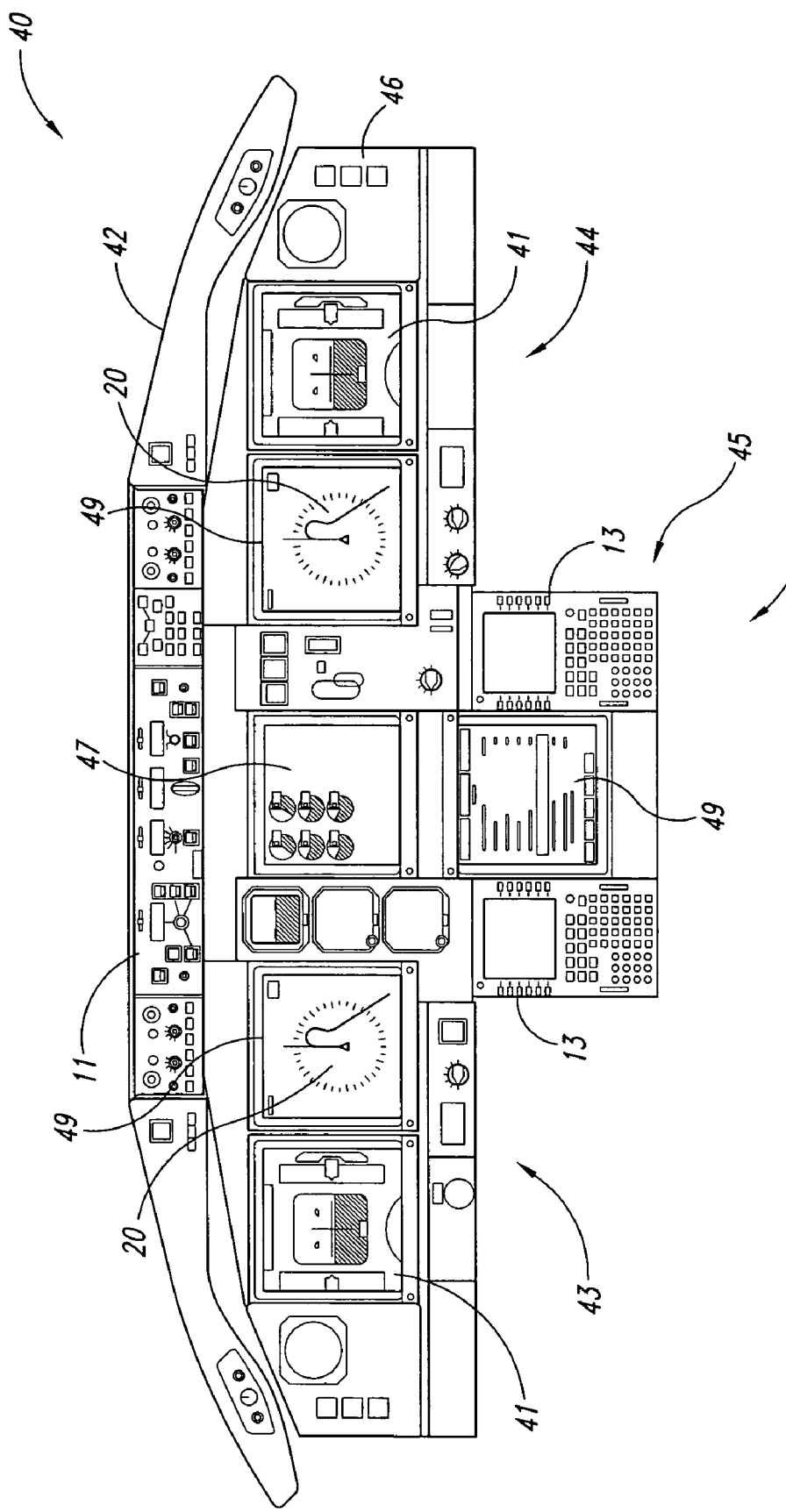
FIGS. 1A-1B illustrate a flight deck and map display in accordance with the prior art.
Figure 1B:
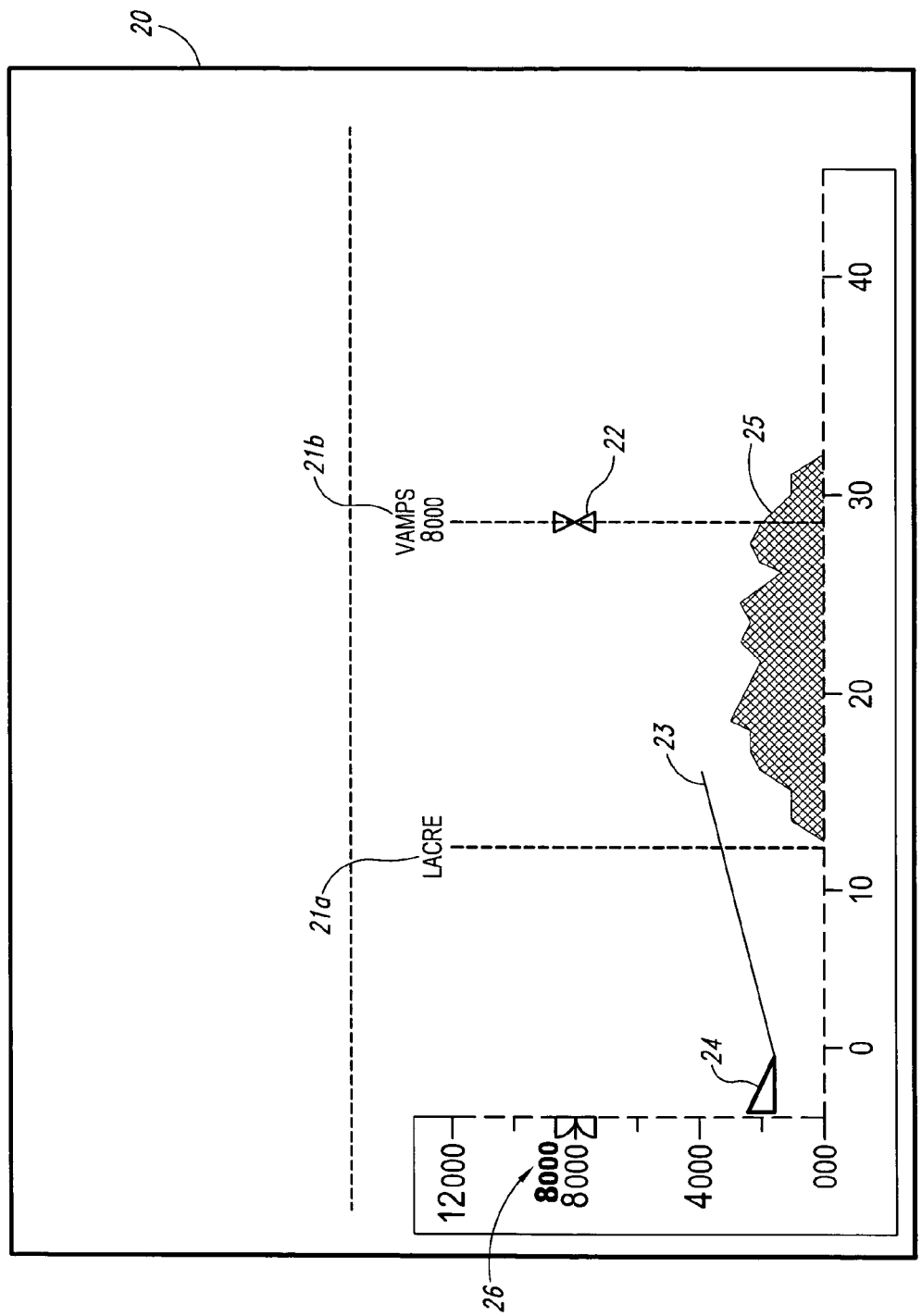
Figure 2A:
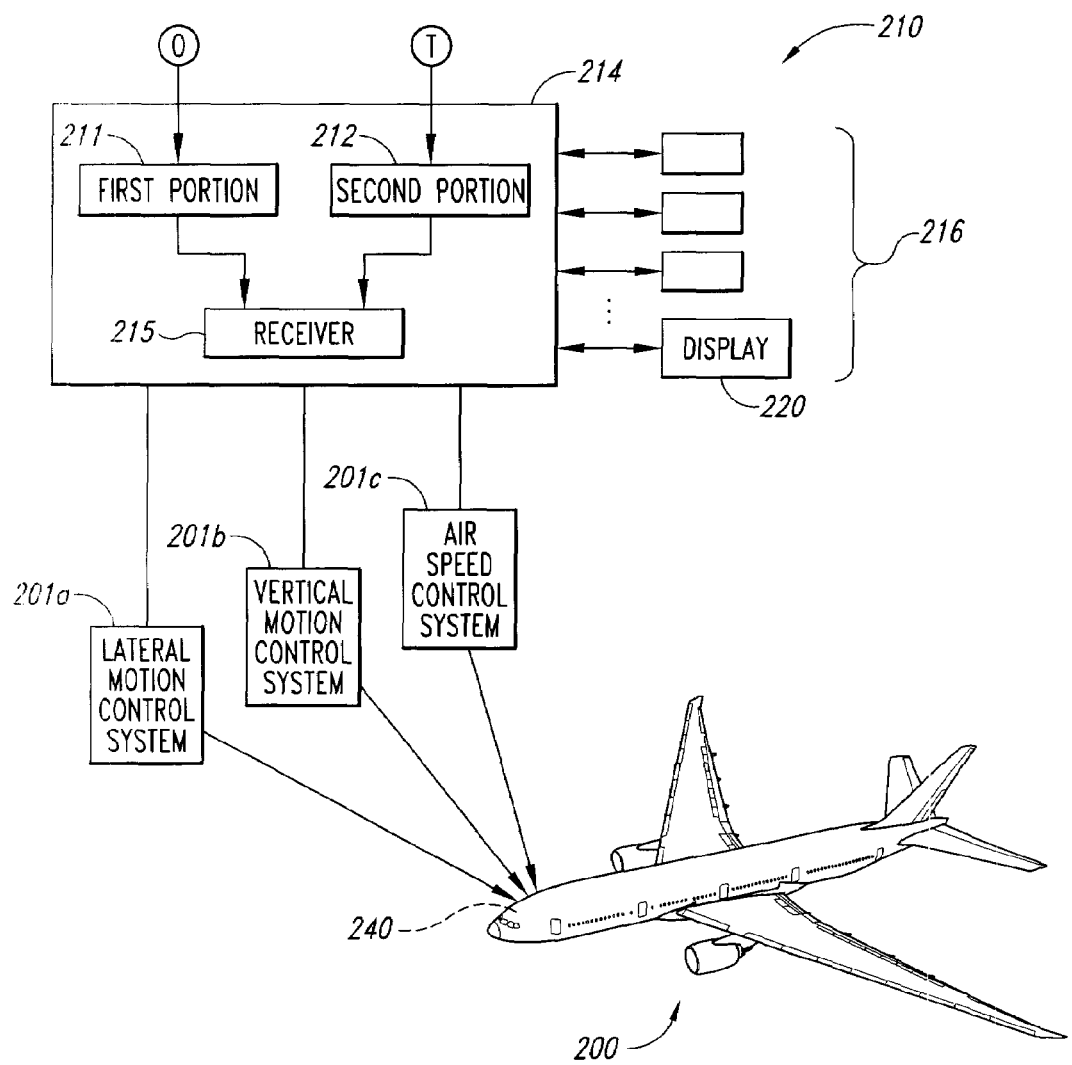
FIG. 2A is a schematic illustration of an aircraft system configured to display navigation and flight mode information at an aircraft flight deck in accordance with an embodiment of the invention.

FIG. 2A is a schematic illustration of an aircraft 200 having a system 210 configured to receive, process, and/or display information in accordance with an embodiment of the invention. Portions of the system 210 can be housed at a flight deck 240 of the aircraft 200 for access by an operator (e.g., a pilot). The aircraft 200 can have a fixed wing configuration (as shown in FIG. 2A) or other configurations (e.g., rotary wing configurations). In one aspect of this embodiment, the system 210 can include input/output devices 216 via which the operator and/or aircraft subsystems can provide information to a computer (e.g., a flight guidance computer 214). The flight guidance computer 214 can include a processor and memory which can be distributed between a first portion 211 and a second portion 212, both coupled to a receiver portion 215. The first and second portions 211 and 212 can provide aircraft control instructions to the receiver portion 215 which can then be conveyed to a display 220 that is visually accessible by the operator. Accordingly, the display 220 can present to the operator relevant instructions, as well as the source of instructions, whether the source includes the first portion 211 or the second portion 212.

In a particular aspect of this embodiment, the first portion 211 can include a mode control panel (MCP) and can accordingly receive authorization to implement control instructions via an operator input O. The second portion 212 can include a flight management computer or system (FMC or FMS) and can accordingly include a flight plan list of flight segments that are automatically initiated when a threshold condition T (e.g., altitude or waypoint) is met. In other embodiments, the first portion 211 and the second portion 212 can include other devices and/or arrangements, e.g., the first portion 211 can include autoflight computers, autopilots, and/or autothrottles. In any of these embodiments, the flight guidance computer 214 can be linked to one or more aircraft control systems 201, shown in FIG. 2A as a lateral motion or a roll control system 201a, a vertical motion controller 201b, and an air speed or engine control system 201c to control the aircraft direction, altitude and speed. The flight guidance computer 214 directs the operation of the control systems 201 either automatically as conditions are met, or automatically upon receiving an authorized input from the operator, or by automatically providing guidance cues to the operator who then manually controls the aircraft 200.

Figure 2B:
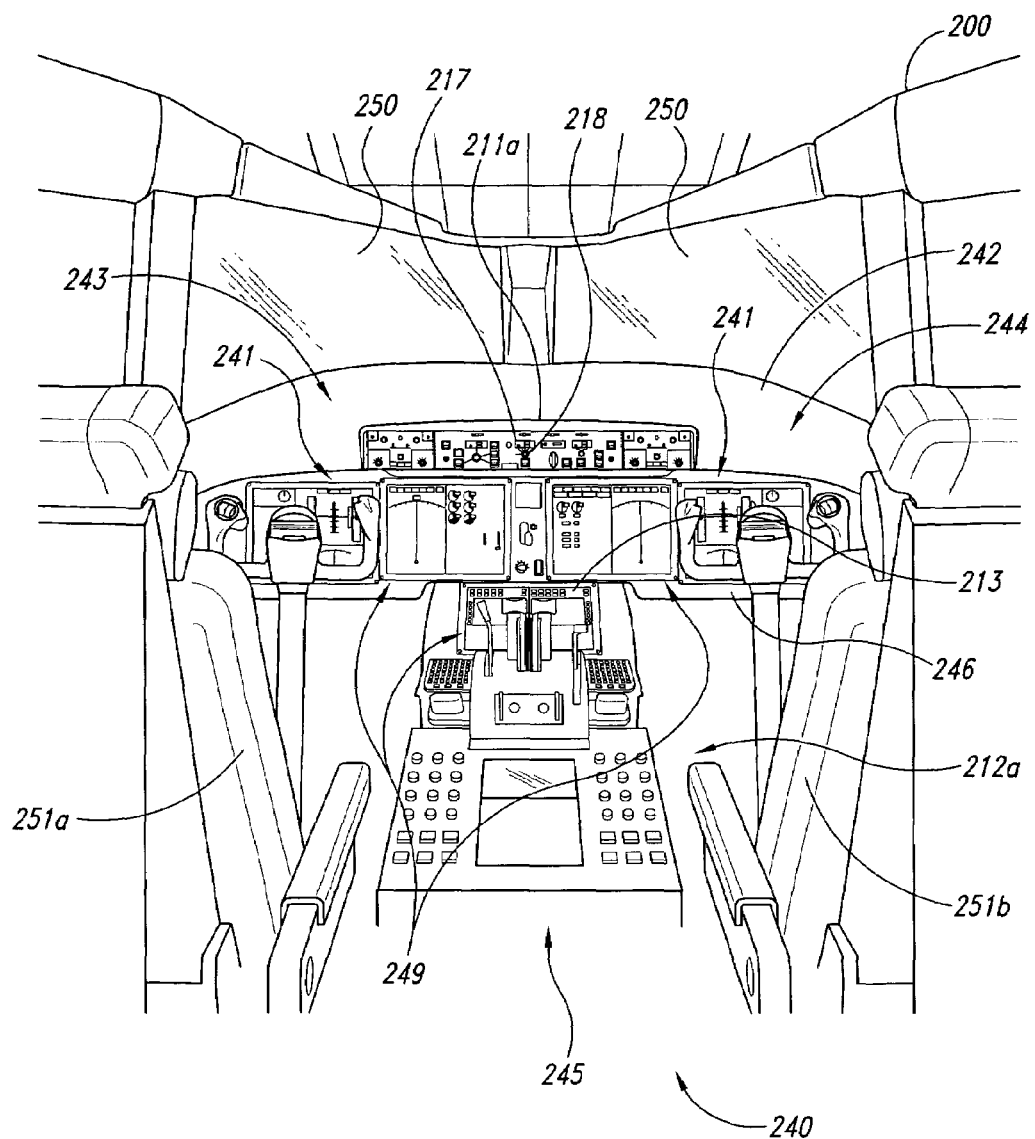
FIG. 2B illustrates a flight deck having instruments and display media configured to present information to operators in accordance with an embodiment of the invention.

FIG. 2B illustrates further details of an embodiment of the flight deck 240 described above. The flight deck 240 can include forward windows 250 providing a forward field of view from the aircraft 200 for operators seated in a first seat 251a and/or a second seat 251b. In other embodiments, the forward windows 250 can be replaced with one or more external vision screens that include a visual display of the forward field of view out of the aircraft 200. A glare shield 242 can be positioned adjacent to the forward windows 250 to reduce the glare on one or more flight instruments 244 and display screens 243 positioned on a control pedestal 245 and a forward instrument panel 246. The glare shield 242 can also house a mode control panel (MCP) 211a positioned above the display screens 243. The MCP 211a can include an MCP altitude window 217 which displays MCP targets entered by the operator, and an MCP altitude knob 218, via which the operator can enter and authorize the targets. The display screens 243 can include primary flight displays (PFDs) 241 that provide the operators with actual flight parameter information (e.g., flight attitude, airspeed and altitude), and multifunction displays (MFDs) 249 that display other operator-selectable information. One of the MFDs 249 can emulate a control and display unit (CDU) 213, and can provide inputs to and outputs from a flight management computer (FMC) 212a. Aspects of the manners in which the system 210 displays the source of instructions for controlling the motion of the aircraft 200 are described in greater detail below with reference to FIGS. 2B-10. Certain descriptions of the manners by which the system 210 operates refer back to aspects of the system 210 described above (e.g., the first and second portions 211, 212, the MCP 211a and the FMC 212a).

Figure 3A:
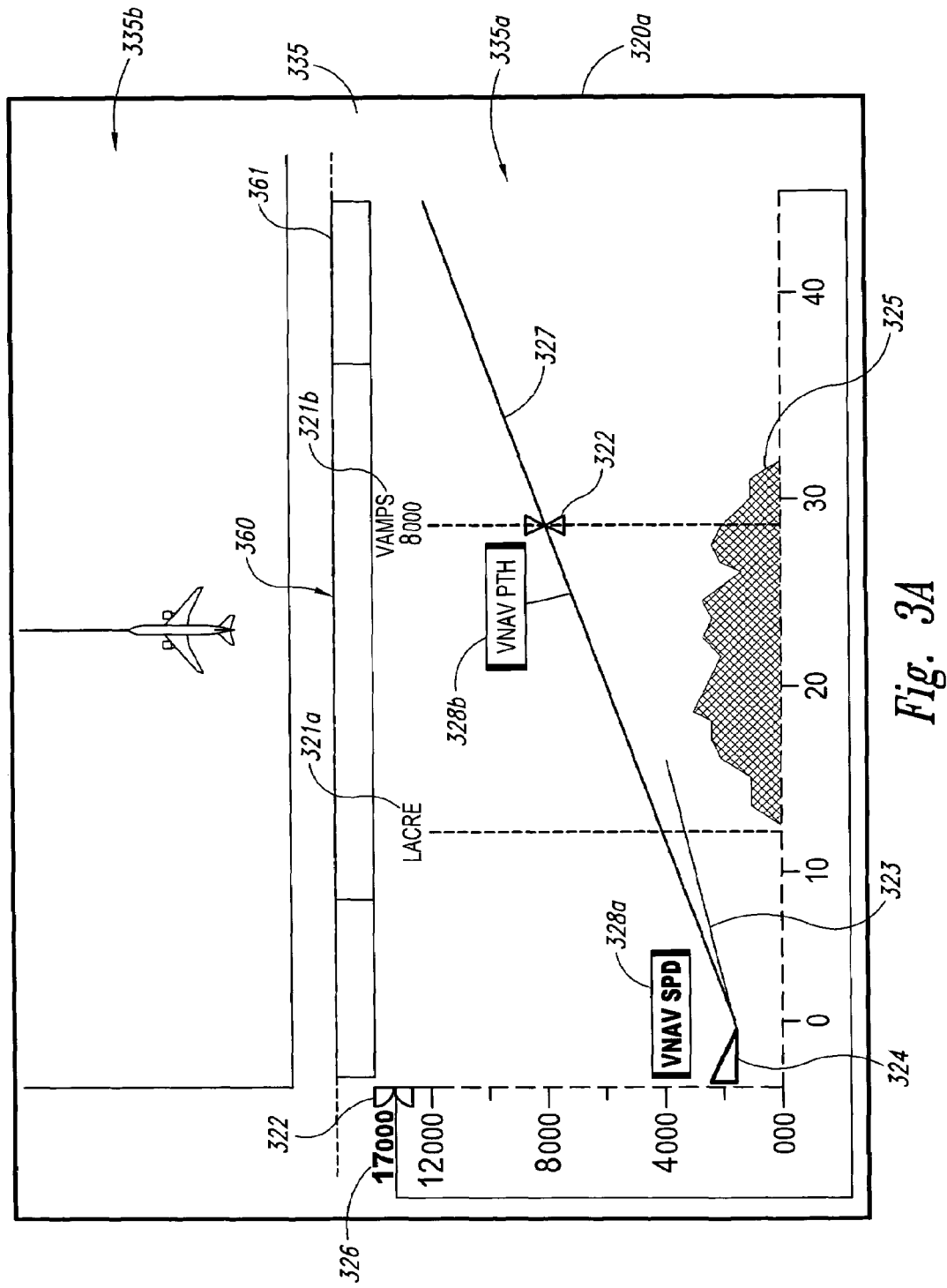
FIGS. 3A-3B illustrate displays identifying current and upcoming pitch control modes along with corresponding maps, in accordance with an embodiment of the invention.

FIG. 3A illustrates a display 320a presenting a map 335 along with aircraft behavior information in accordance with an embodiment of the invention. The map 335 can include an elevation view portion 335a (e.g., a vertical situation display or VSD) and/or a plan view portion 335b, details of which are not shown in FIG. 3A. The elevation view portion 335a can depict altitude along the vertical axis and ground distance along the horizontal axis), and the plan view portion 335b can have latitude and longitude axes. For purposes of illustration, many of the aspects of the invention are described in the context of the elevation view portion 335a, but can apply equally to the plan view portion 335b as well.

The display 320a can further include an aircraft indicator 324 identifying the current location of the aircraft relative to the terrain 325 over which the aircraft is flying. A flight path angle trend indicator 323 identifies the current trajectory of the aircraft, and a route indicator 327 identifies the route (e.g., part of the aircraft flight plan) along which the aircraft is being flown. The flight path angle trend indicator 323 may differ from the route indicator 327 as a result of transitory changes in aircraft pitch angle caused by turbulence or other conditions. As the aircraft flies along its route, the position of the aircraft indicator 324 relative to the terrain 325 and the route indicator 327 can be automatically updated to keep the operator apprised of the aircraft's current position.

The display 320a can also include information corresponding to current and future targets and modes by which the aircraft is projected to achieve those targets. For example, the display 320a can include a current target indicator 321a identifying the waypoint to which the aircraft is currently being directed, and a next target indicator 321b identifying the target to which the aircraft will be directed once the current target has been attained. A current mode indicator 328a identifies the mode by which the aircraft will be directed toward the current target (e.g., "VNAV SPD"), and a next mode indicator 328b identifies the mode by which the aircraft will be directed toward the next target (e.g., "VNAV PTH"). As used herein, the term "mode" can refer to any pre-identified flight behavior that the operator can select to achieve a particular target. The modes flown by the aircraft can be received from the first portion 211 (e.g., the MCP) of the system 210 described above with reference to FIG. 2. The targets to which the aircraft will be directed can be received from the first portion 211 and/or the second portion 212 (e.g., the FMC).

The current mode indicator 328a can be presented in a manner different than that of the next mode indicator 328b. For example, the font of the current mode indicator 328a can be different than the font of the next mode indicator 328b. In other embodiments, other aspects of the mode indicators 328 can be different (e.g., the color). For purposes of illustration, the current mode is shown in a bold font in FIG. 3A and the next mode is shown in a normal font. Accordingly, the operator can readily recognize that the current mode is currently controlling the flight of the aircraft, and the next mode will be flown to achieve the next target. The display 320a can also identify an altitude constraint via an altitude constraint indicator 322, and the current value at the MCP altitude window 217 (FIG. 2B) via an MCP window indicator 326.

Figure 3B:
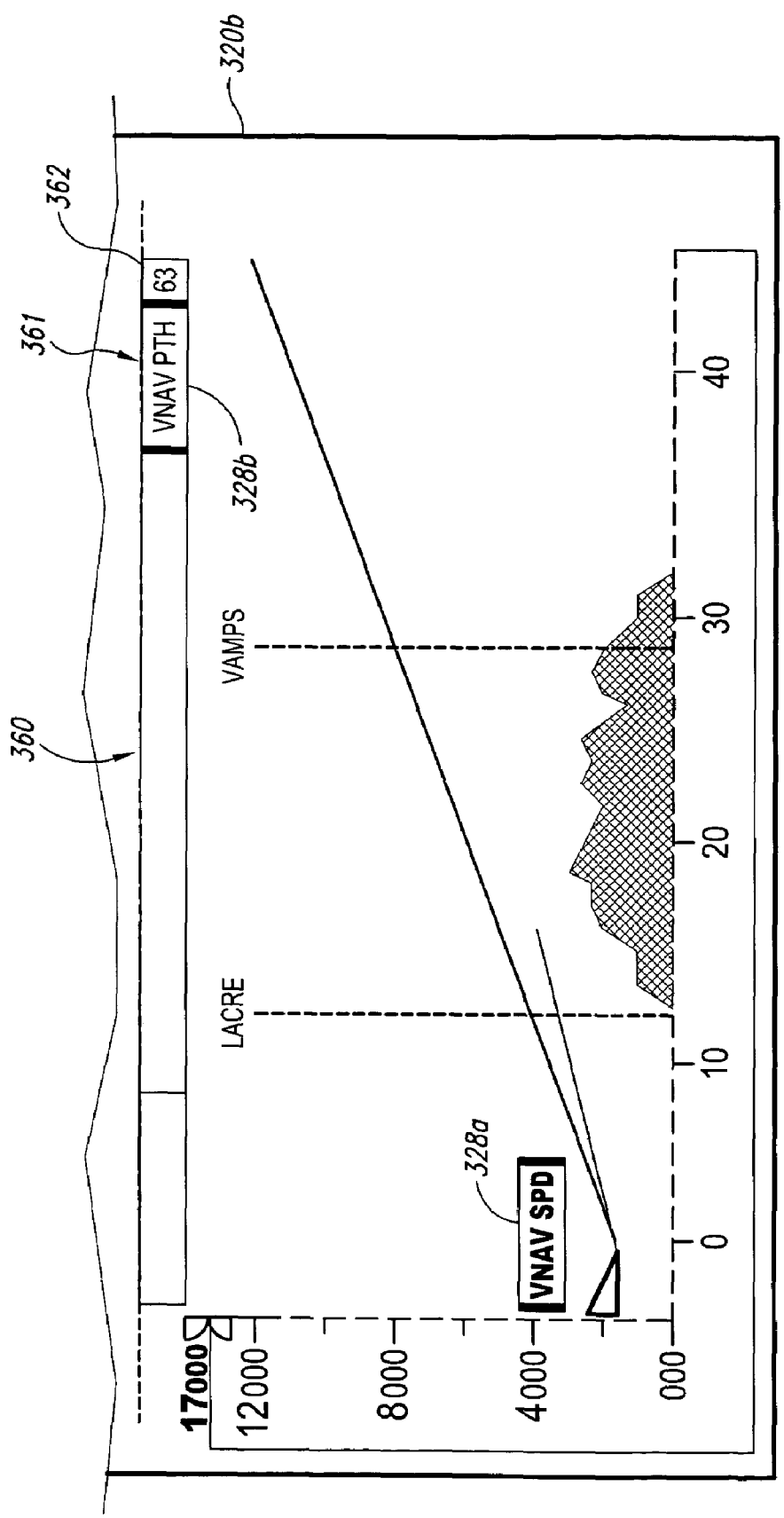

In some situations, the next mode will not appear at the display 320a because it is beyond the range of the map 335. As shown in FIG. 3B, the next mode indicator 328b can accordingly be presented in a different manner than that shown in FIG. 3A. In a particular aspect of this embodiment, a display 320b can include a message field 360 which can in turn include an off-display mode field 361. The next mode indicator 328b can be located at the off-display mode field 361 to indicate that the next mode will be engaged at a point outside the range of the map 335. The off-display mode field 361 can also include a distance indicator 362 indicating (in this case) that the next mode will be engaged 63 nautical miles beyond the current aircraft position. When the next mode is unknown, the display 320c can present an unknown mode indicator at the off-display target field 361. The unknown mode indicator can include three dashes in one embodiment and can include other symbols in other embodiments.

Figure 4A:
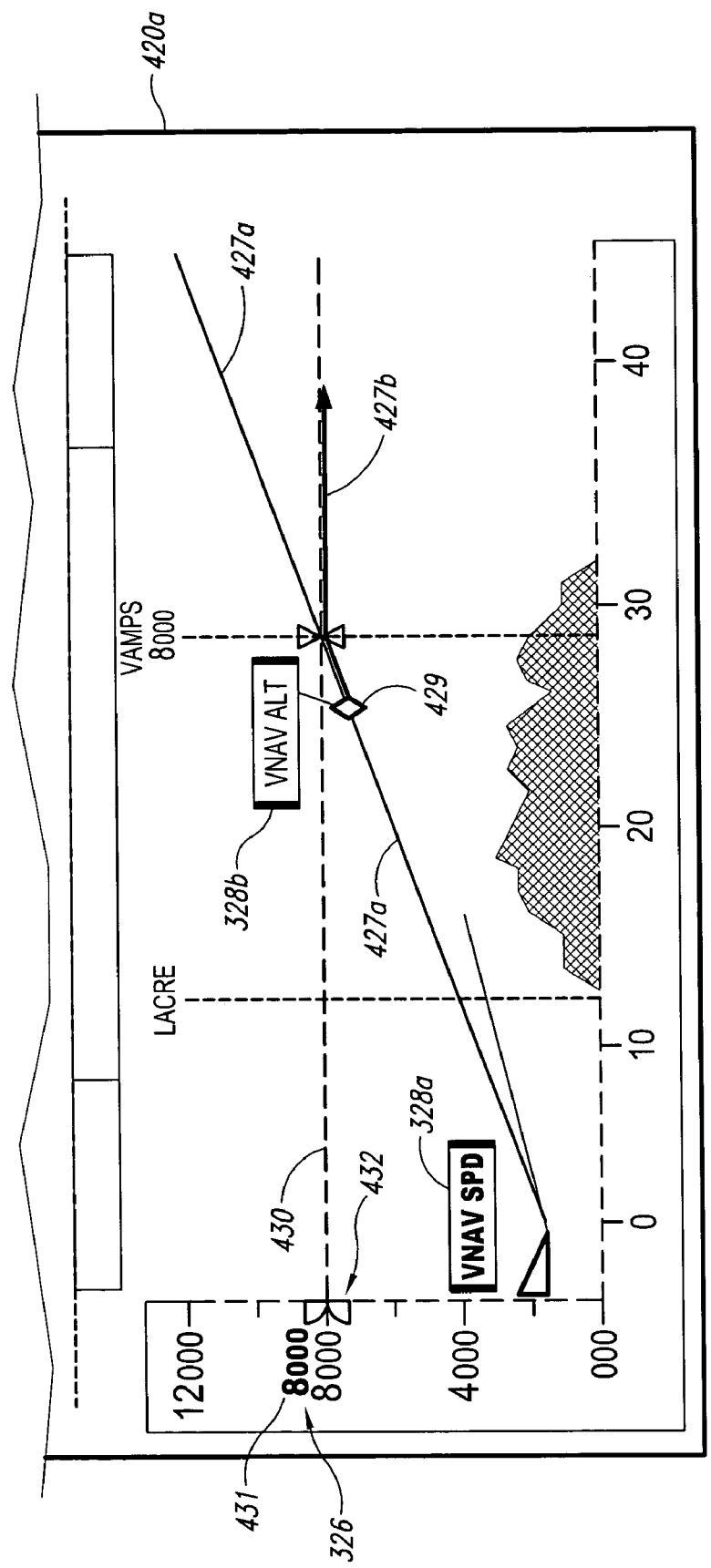
FIGS. 4A-4C illustrate displays presenting predicted flight behavior for an aircraft transitioning from a strategic target to a tactical target.

FIG. 4A illustrates a display 420a presenting a "strategic" (e.g., flight plan) route 427a and a "tactical" route 427b. The strategic route 427a can be received from the second portion 212 or FMC 212a of the system 210 (FIGS. 2A, 2B) and the tactical route 427b can be received from the first portion 211 or MCP 211a of the system 210. Accordingly, the strategic route 427a can correspond to segments of a flight plan route and the tactical route 427b can correspond to segments that deviate from the flight plan route. The display 420a can also present a transition indicator 429 identifying the point at which the aircraft is predicted to transition from the strategic route 427a to the tactical route 427b.

In a particular aspect of this embodiment, the strategic route 427a can be presented in a different manner than the tactical route 427b. For example, the strategic route 427a can be presented in a first color and the tactical route 427b can be presented in another color. For purposes of illustration, the strategic route 427a is identified by a first line thickness and the tactical route 427b is identified by a second, heavier line thickness in the Figures. As is also shown in FIG. 4A, the current mode indicator 328a is tied to (e.g., positioned next to) the strategic route 427a and the next mode indicator 328b is tied to (e.g., positioned next to and/or connected with a line to) the tactical route 427b. Accordingly, the operator can understand with a glance at the display 420a that the current mode 328a is one that is received from the second portion 212 of the system 210 (e.g., the FMC 212a) and that the next mode 328b is received from the first portion 211 of the system 210 (e.g., the MCP 211a). The operator can also easily identify where the transition from strategic to tactical operation will occur, by referring to the transition indicator 429.

The MCP window indicator 326 presented at the display 420a can include an MCP window value 431 (e.g., 8,000 feet as shown in FIG. 4A) and an MCP altitude line 430 (located at 8,000 feet). The MCP altitude line 430 can reinforce in the operator's mind the fact that the tactical route 427b is obtained from the MCP 211a (or other first portion 211) as a result of an altitude value entered and authorized at the MCP altitude window 217 (FIG. 2B).

Figure 4B:
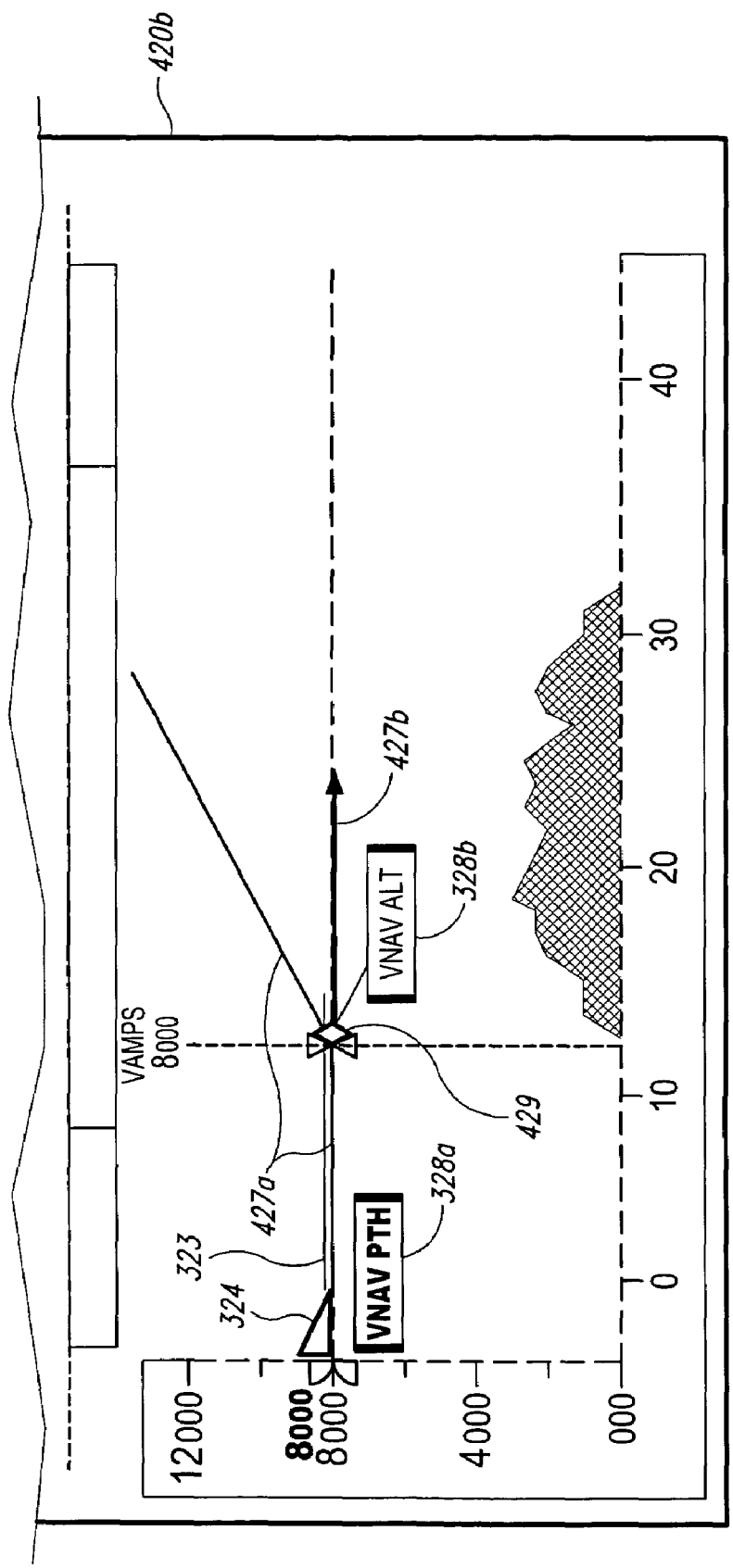

FIG. 4B illustrates a display 420b presenting mode and route information corresponding to a situation in which the aircraft is currently flying in a strategic manner at 8,000 feet, following the strategic route 427a. The strategic route 427a includes an ascent at waypoint "VAMPS." However, because the MCP 211a has an authorized altitude input of 8,000 feet, the aircraft will continue flying level at 8,000 feet. This departure from the strategic route 427a is highlighted for the operator by the transition indicator 429 and the tactical route 427b presented at the display 420b.

Figure 4C:
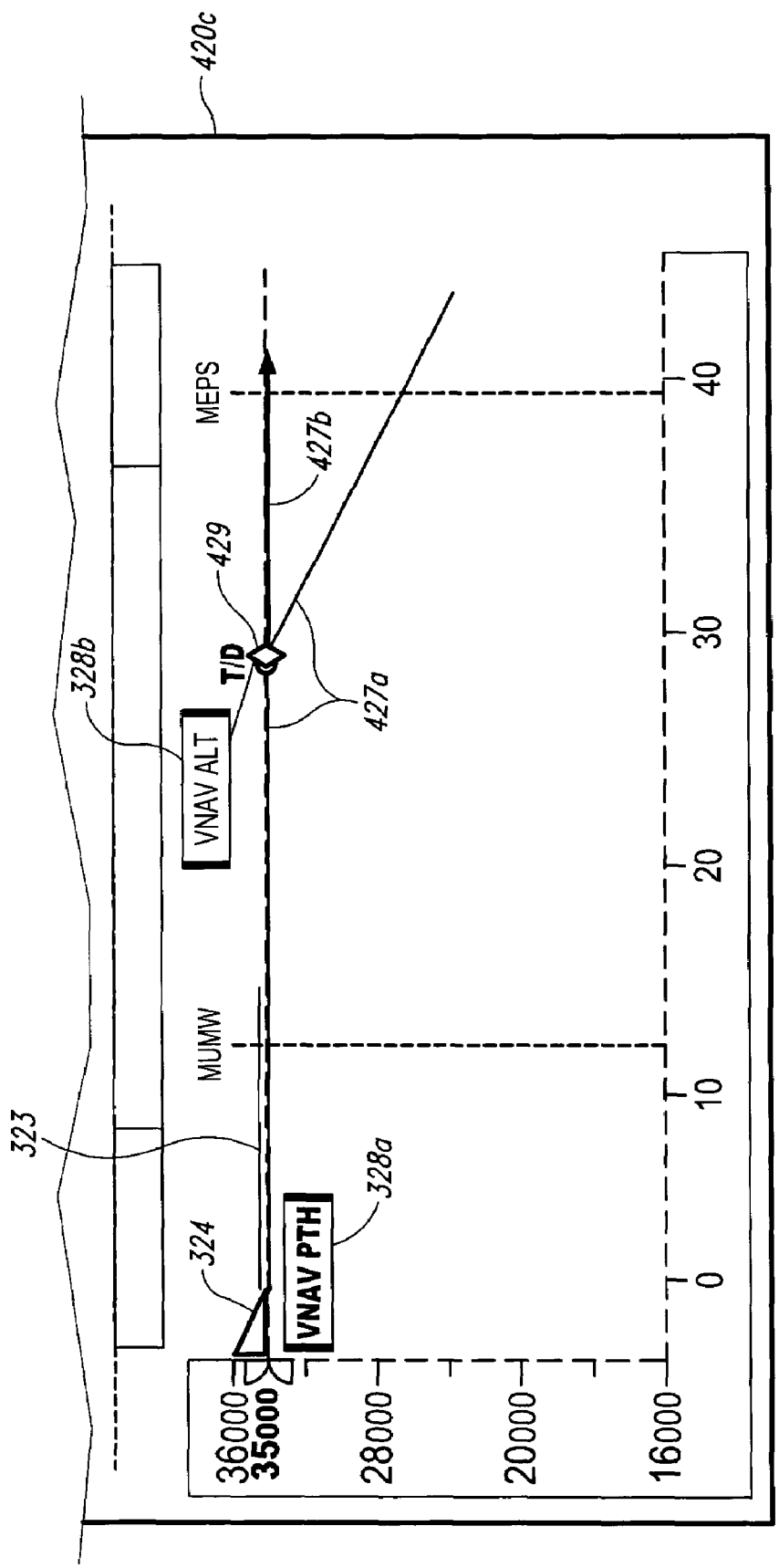

FIG. 4C illustrates a display 420c presenting a situation in which the aircraft is currently following the strategic route 427a and flying level at 35,000 feet. In this situation, the strategic route 427a includes a descent after waypoint "MUMW" (e.g., a top of descent point "T/D"). However, because an altitude of 35,000 feet has been entered and authorized at the MCP 211a, the aircraft will continue flying level at 35,000 feet, along the tactical route 427b.

FIGS. 5A-5D illustrate displays presenting information when the aircraft is currently flying in a tactical manner. The displays also present the strategic route so that the operator can understand where the strategic route is relative to the aircraft's current position, and where, if at all, the aircraft can reconnect with the strategic route, given its current trajectory. Beginning with FIG. 5A, a display 520a can present a current mode 528a, a next mode 528b, an tactical route 527b and a strategic route 527a. Because the aircraft indicator 524 shows the aircraft on the tactical route 527b and off the strategic route 527a, it is apparent to the pilot that the aircraft is currently flying in a tactical manner. The display 520a can also present a transition indicator 529 identifying where the aircraft can reconnect with the strategic route 527a, and the mode by which the aircraft will be controlled at that point.

Figure 5A:
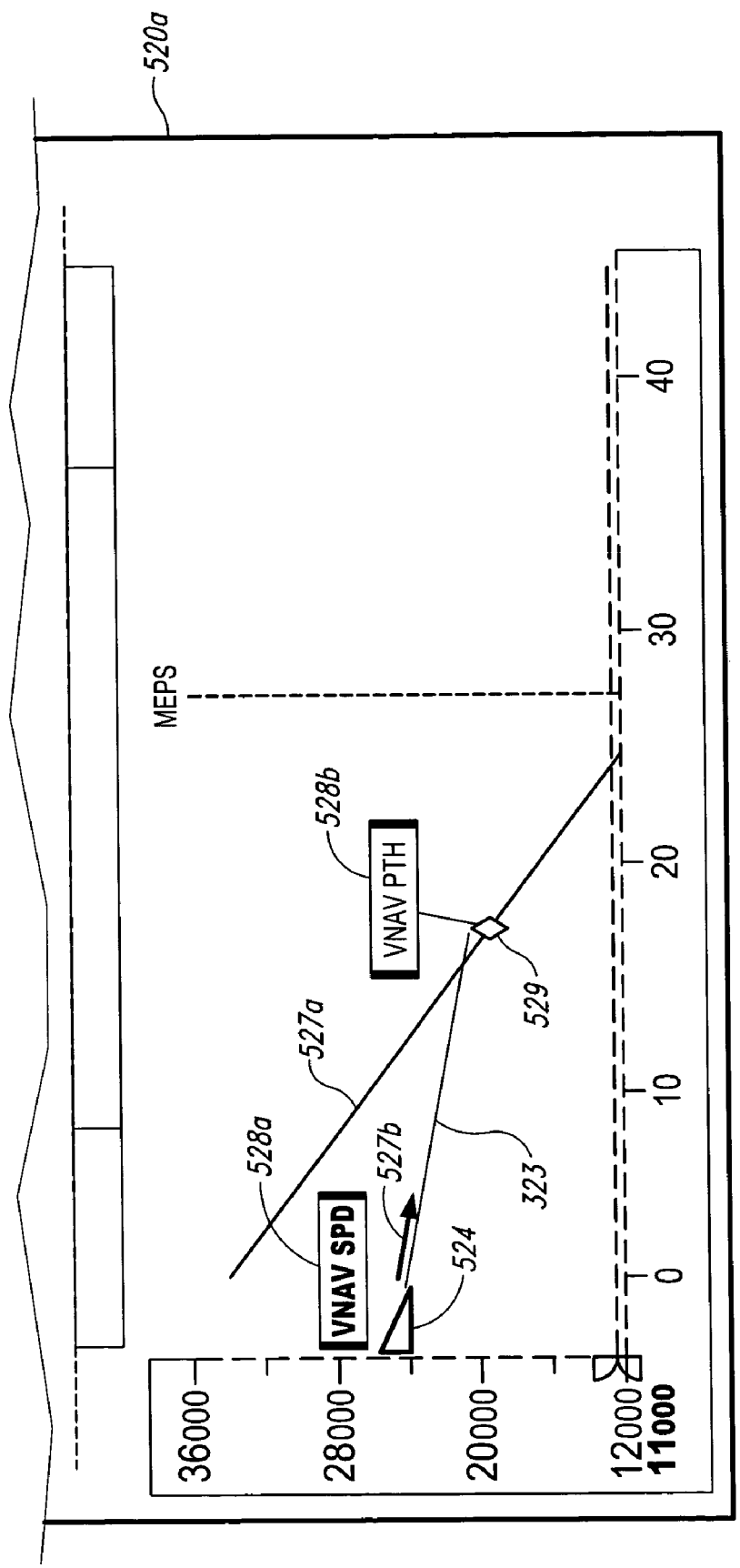
FIGS. 5A-5D illustrate aircraft displays presenting information corresponding to predicted flight behavior for an aircraft transitioning from a tactical target to a strategic target in accordance with an embodiment of the invention.
Figure 5B:
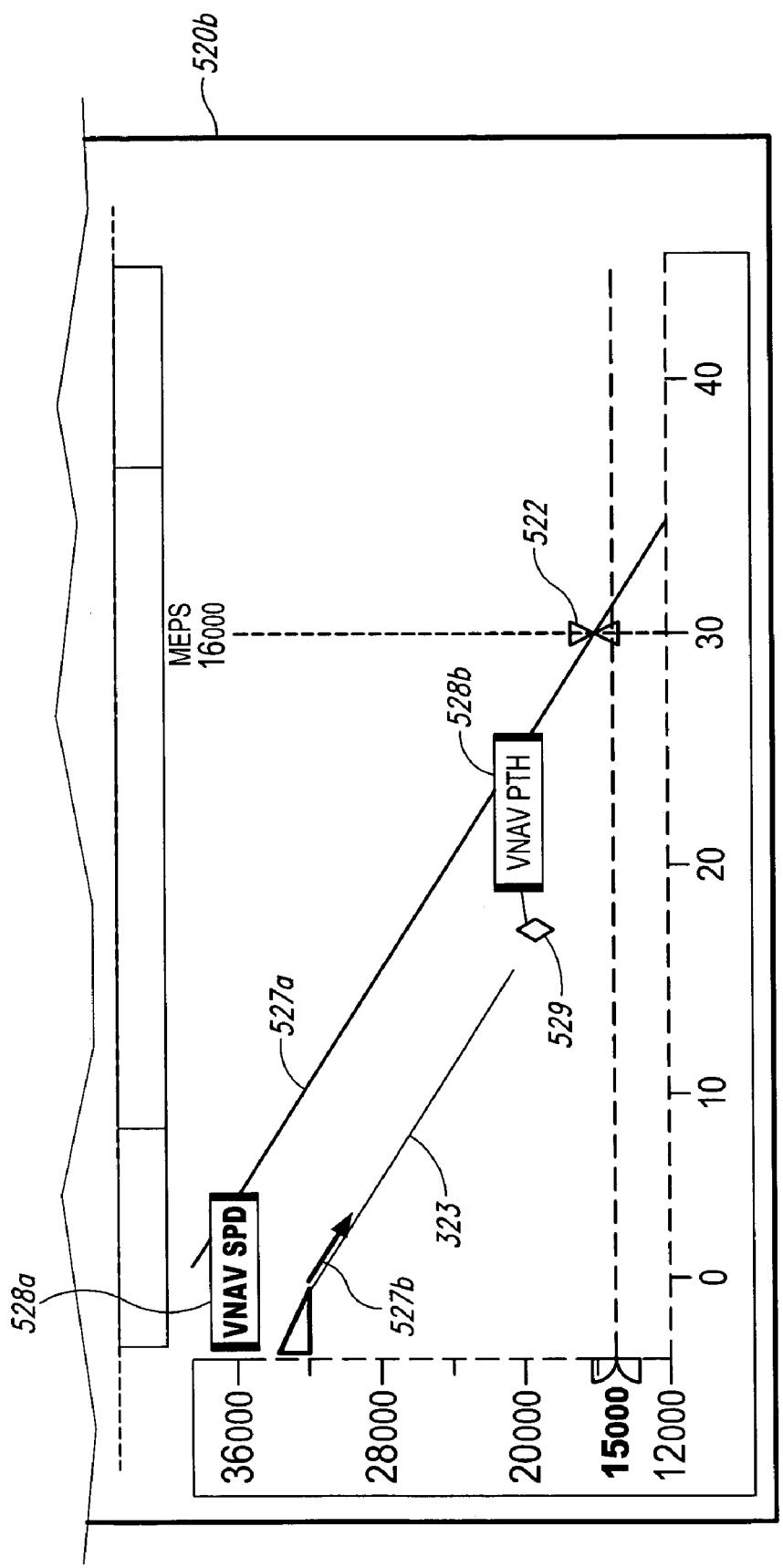

FIG. 5B illustrates a display 520b presenting an tactical route 527b that is below a strategic route 527a. The display 520b also highlights an altitude constraint indicator 522, in this case set at 16,000 feet. Because the aircraft's route is constrained at 16,000 feet, the system will honor the constraint by causing the aircraft to level off as it approaches the constraint altitude, as indicated by the transition indicator 529. At this point, the aircraft will transition from a current mode 528a of "VNAV SPD" to the next mode 528b of the "VNAV PTH" and reconnect with the strategic route 527a. In a particular aspect of this embodiment, the aircraft can automatically reconnect with the strategic route 527a, assuming the current aircraft path intersects the strategic route 527a. For example, when both the current (tactical) mode 528a and the next (strategic) mode 528b are "VNAV" modes, the aircraft can automatically reconnect to the strategic route 527a. In other embodiments, the reconnection may occur only when the operator authorizes such a step.

Figure 5C:
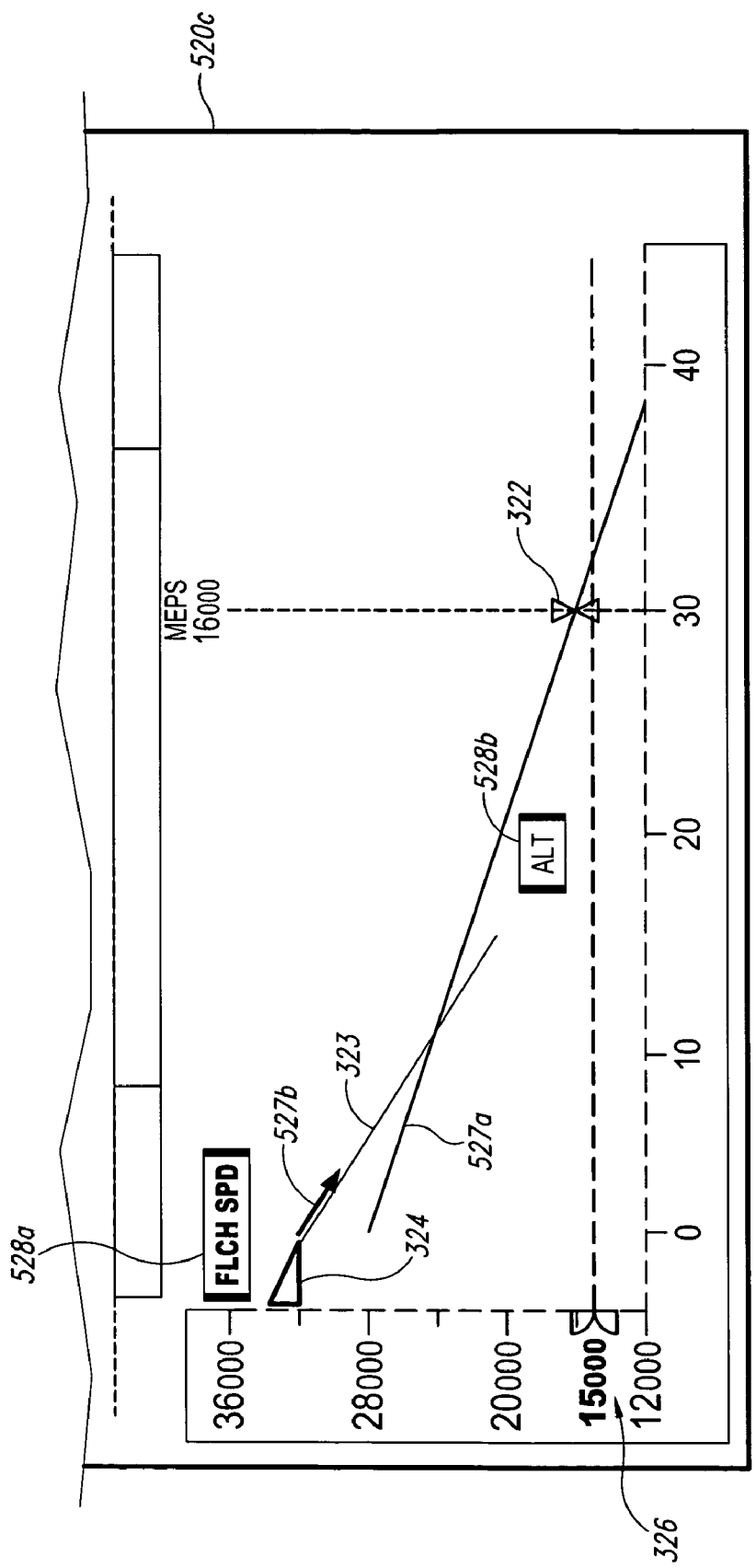

FIG. 5C illustrates the situation in which the current mode of the aircraft will not result in an automatic reconnection with the strategic route. In this case, the current mode ("FLCH SPD") is a purely tactical mode. Accordingly, the aircraft will proceed to the altitude identified by the MCP window indicator 326 (i.e., 15,000 feet), where the aircraft will fly according to the next mode "ALT." The system will ignore the altitude constraint at 16,000 feet.

Figure 5D:
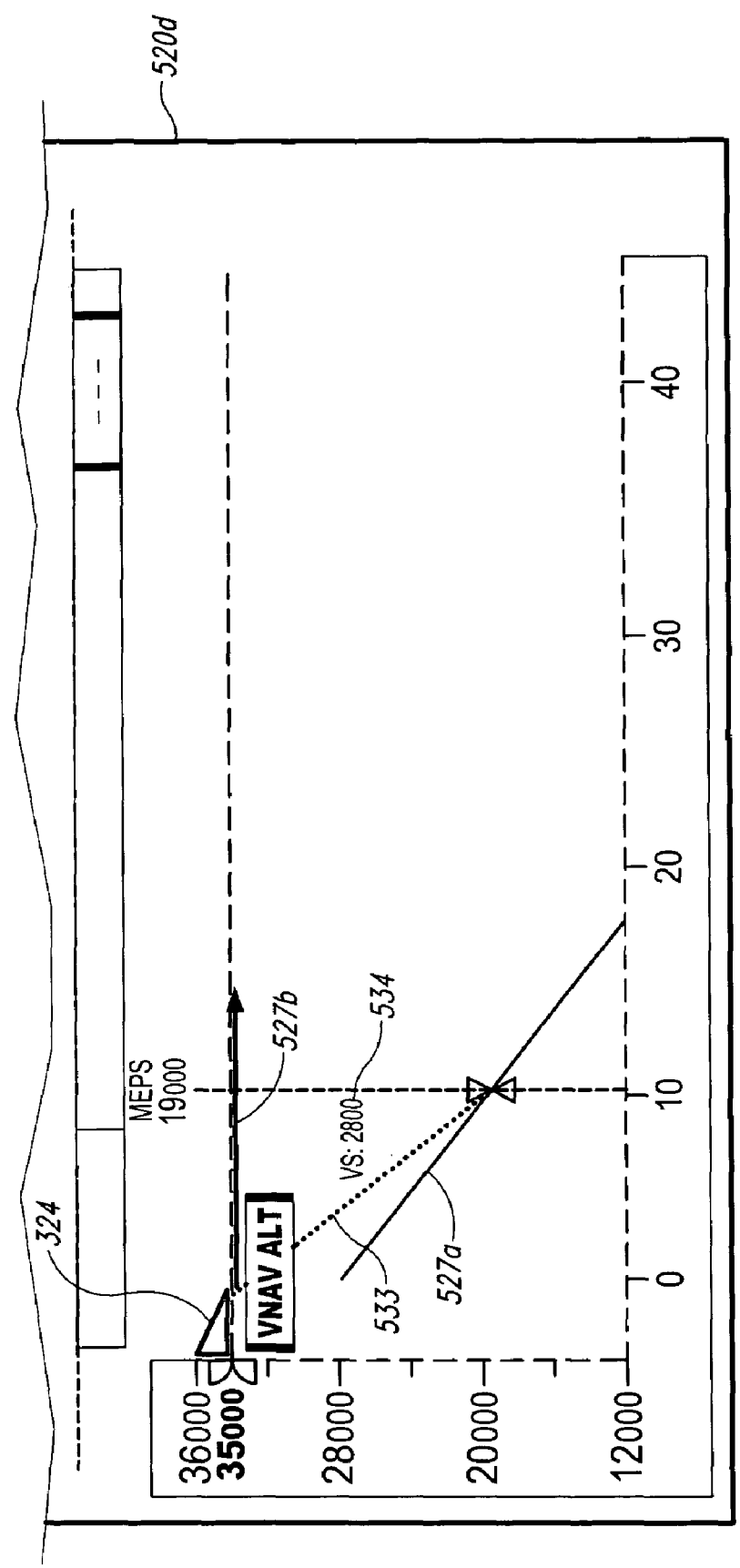

In FIG. 5D, a display 520d presents information while the aircraft is proceeding in a tactical manner along a tactical route 527b at an altitude of 35,000 feet, while the strategic route 527a includes a descent, with a constraint at 19,000 feet. The display 520d includes a connector route 533 shown in a manner different than either the strategic route 527a or the tactical route 527b (e.g., as indicated by dashed lines in FIG. 5D). Accordingly, the connector route 533 can highlight to the operator the path that the aircraft will need to follow in order to reconnect with the strategic route 527a, while also meeting the altitude constraint of 19,000 feet at waypoint "MEPS." The display 520d can also include a vertical speed indicator 534 identifying the vertical speed necessary for the aircraft to make this transition. With this information, the operator can readily determine whether and how the aircraft will make the transition to the strategic route 527a while still meeting the altitude constraint. If the required descent rate becomes too high, the operator can take another action, for example, seeking clearance to ignore the altitude constraint.

Figure 6A:
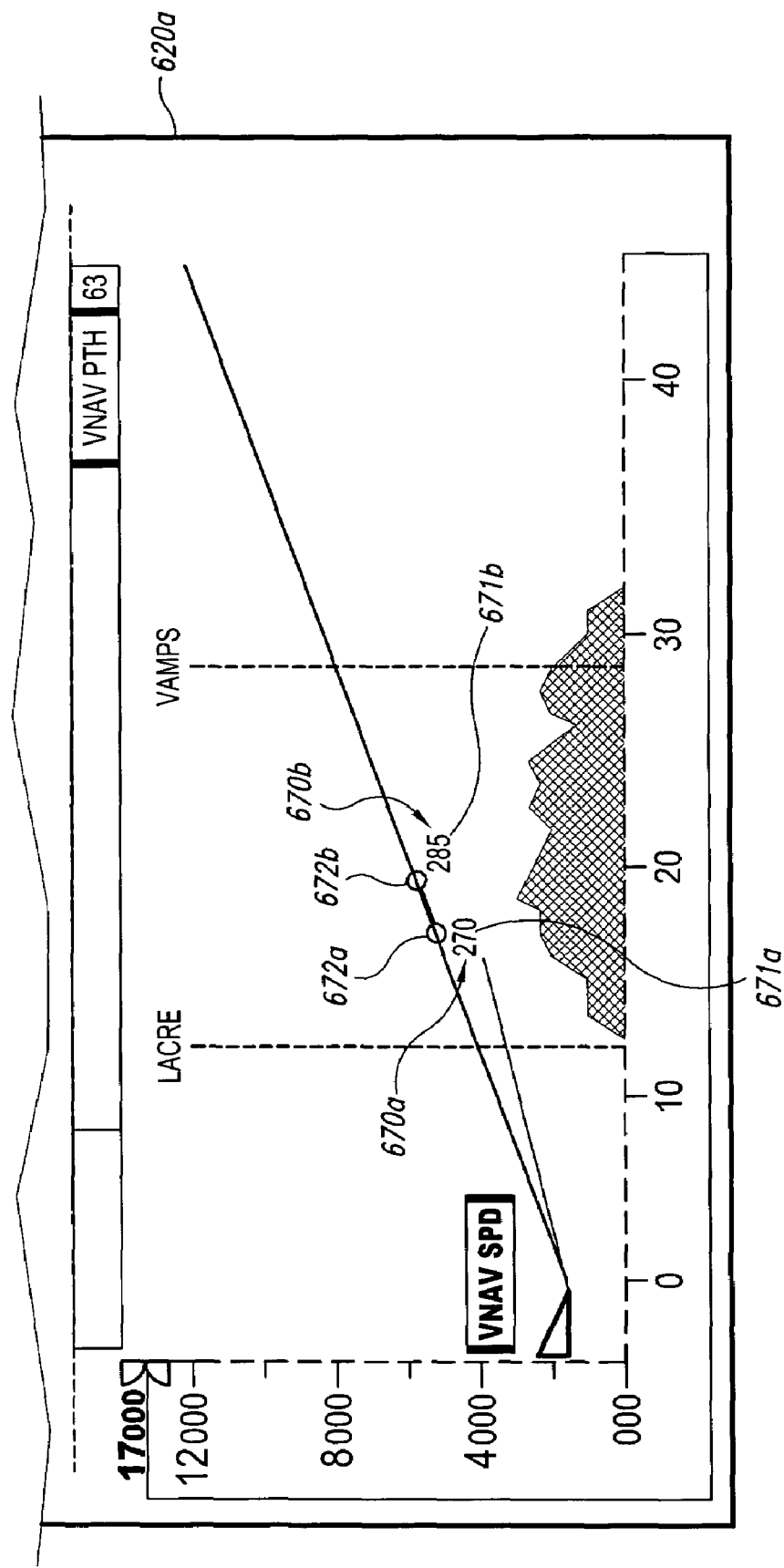
FIGS. 6A-6B illustrate a display presenting air speed transition information in accordance with yet another embodiment of the invention.

In other embodiments, target information other than that associated with pitch modes can be displayed in addition to, or in lieu of, the pitch modes described above. For example, as shown in FIG. 6A, a display 620a can present a strategic (e.g., flight plan) current speed indicator 670a and a strategic next speed indicator 670b. The strategic current speed indicator 670a can include a current speed value 671a (e.g., 270 knots) and a beginning transition point 672a (shown as a circle in FIG. 6A). Accordingly, the operator can readily identify the speed to which the aircraft is currently being controlled and the location at which the speed will begin transitioning to the next value. The strategic next speed indicator 670b can include an ending transition point 672b identifying where the speed transition will be completed, and a next speed value 671b identifying the speed that the aircraft will attain upon completing the transition (e.g., 285 knots). The strategic speed indicators can be presented in a manner consistent with the strategic route 427a described above (e.g., with thin lines).

Figure 6B:
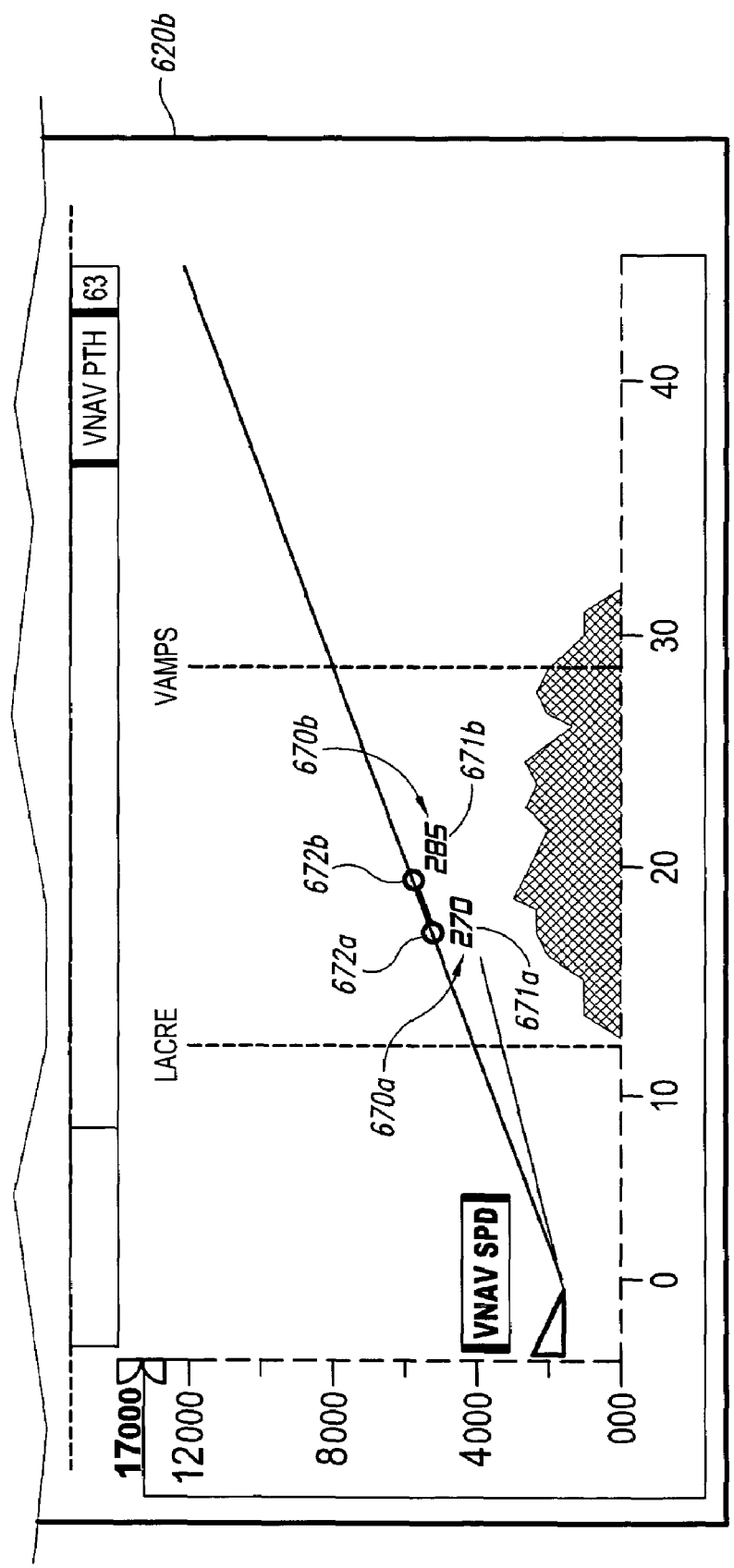

FIG. 6B illustrates a display 620b presenting the speed indicators 670, speed values 671, and transition points 672 when the aircraft speed is being controlled in a tactical manner (e.g., by the first portion 211 or MCP 211a described above), rather than in a strategic manner (e.g., by the second portion 212 or FMS 212a). Accordingly, these elements are shown in a manner different than that illustrated in FIG. 6A (e.g., via italics, a different color or other display technique). As a result, the operator can understand that these values are inactive (because speed is being controlled by the first portion 211a). The operator can also easily understand what the target aircraft speeds will be if the operator shifts from tactical to strategic operation.

Figure 7:
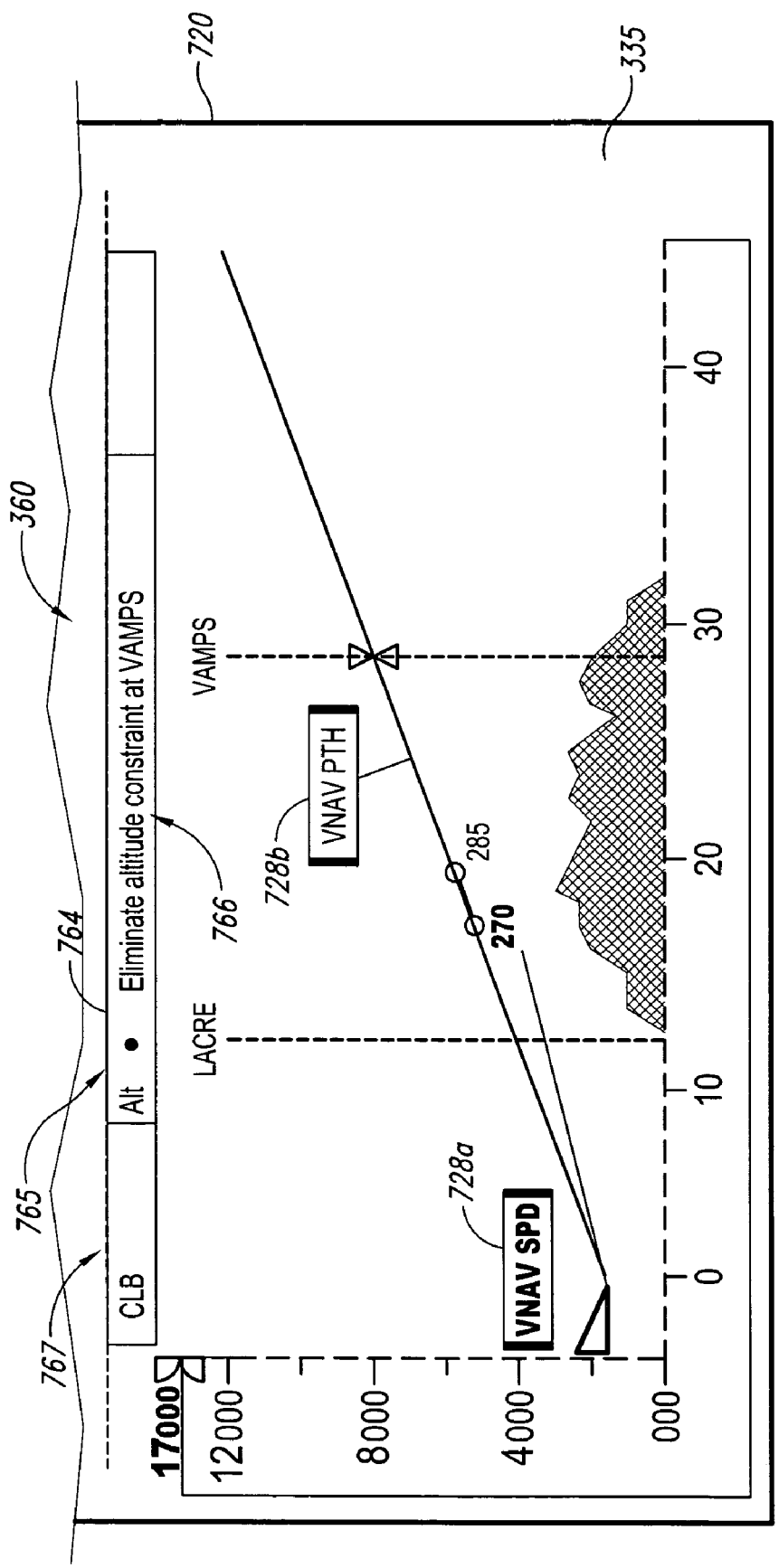
FIG. 7 illustrates a display presenting information corresponding to the expected effect resulting from entering an input at a mode control panel in accordance with another embodiment of the invention.

FIG. 7 illustrates a display 720 presenting additional information at the message field 360 introduced above with reference to FIG. 3. In one aspect of an embodiment shown in FIG. 7, the message field 360 can include an MCP function field 764 providing textual information identifying what will happen when the operator takes a particular action at the MCP. Accordingly, the MCP function field 764 can include an input identifier 765, and a function field 766. The input identifier 765 identifies the input device that, when activated, will perform the function identified by the function field 766. In an embodiment shown in FIG. 7, the input identifier 765 identifies the MCP altitude knob 218 (FIG. 2B) as the relevant input device, and the function field 766 indicates that, when the MCP altitude knob 218 is activated, the altitude constraint at waypoint "VAMPS" will be eliminated.

An advantage of the foregoing feature is that it can more clearly identify to the operator the effect of providing a particular input at the MCP. In particular, the MCP altitude knob 218 can have, in some cases, up to seven possible effects when it is activated, depending upon the current state of the aircraft. These effects include initiating a climb, initiating a descent, eliminating an altitude constraint at a waypoint, changing a cruise altitude value, initiating a climb to a new cruise altitude, initiating a descent to a new cruise altitude, or no effect at all. By providing a clear textual indication to the operator, the system can reduce the time required by the operator to determine the effect of activating the MCP input device and can accordingly increase the efficiency with which the operator flies the aircraft.

The message field 360 can also include a flight phase field 767 that identifies the phase of flight in which the aircraft is currently engaged. This phase can include, for example, "ground" (indicating that the aircraft is on the ground), "TO" (indicating that the aircraft is at takeoff), "CLB" (indicating that the aircraft is climbing), "CRZ" (indicating that the aircraft is at cruise), "CRZ CLB" (indicating that the aircraft is climbing to a new cruise altitude), "CRZ DES" (indicating that the aircraft is descending to a new cruise altitude), "CRZ/Early DES" (indicating that the aircraft is beginning an early descent from cruise), "DES" (indicating that the aircraft is in descent), "APP" (indicating that the aircraft is on approach), and "missed APP" (indicating that the aircraft is flying a missed approach procedure). This information, particularly when presented proximate to the map 335 and the current and next mode indicators 728a, 728b, can shorten the amount of time required by the operator to determine what the aircraft is doing, why it is doing it, and what the aircraft's next step will be.

Figure 8:
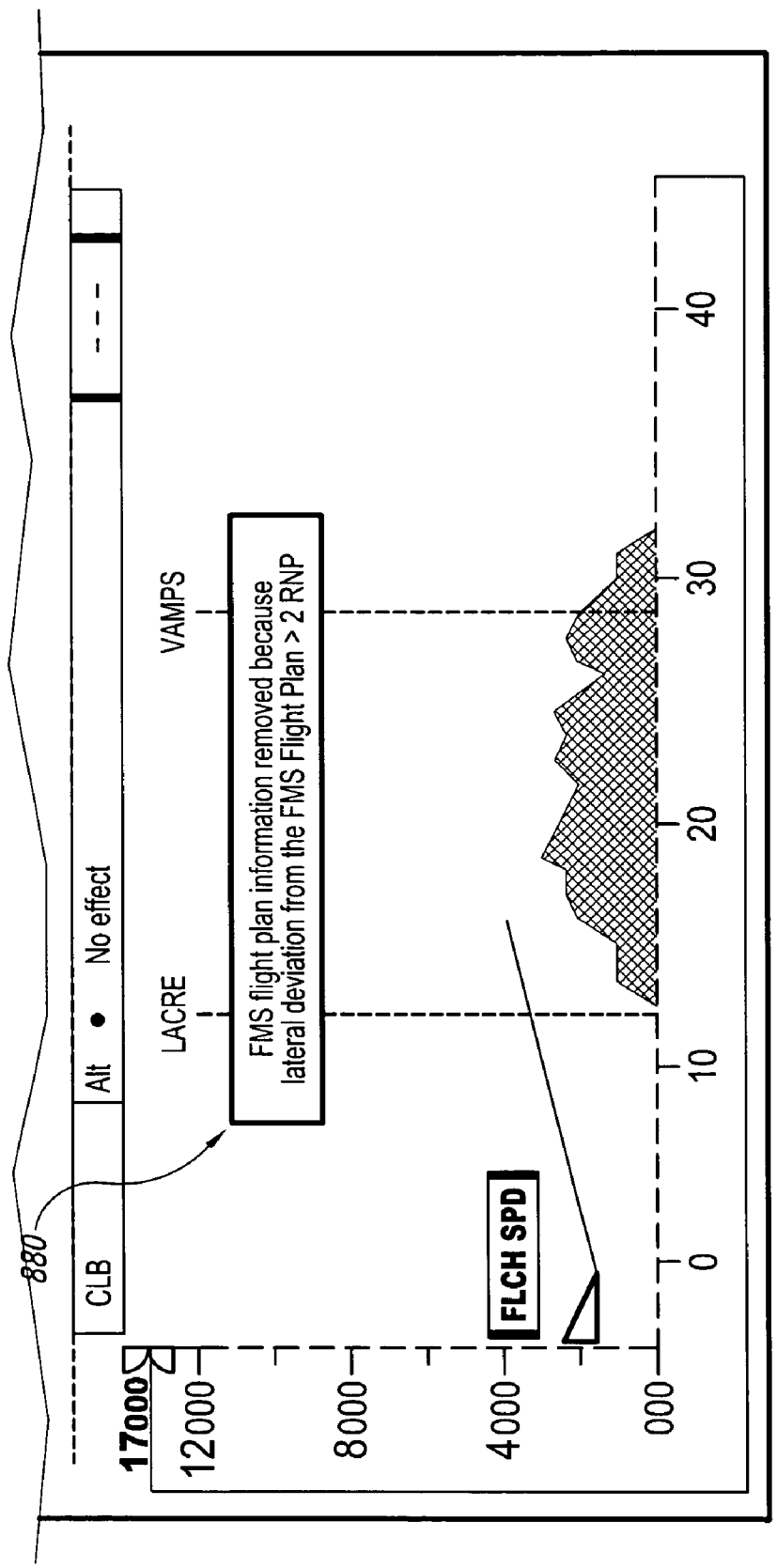
FIG. 8 illustrates a display presenting a message indicating that the aircraft has deviated laterally from a pre-established flight plan by a threshold amount.

In some cases, the aircraft may deviate from the flight plan (e.g., the strategic route) not only vertically but also laterally. When the lateral deviation is significant, the strategic route shown at the elevation view portion of the map may have limited value because it may be positioned over significantly different terrain than the actual flight path of the aircraft. In this case, as shown in FIG. 8, the system can display a lateral deviation field 880 indicating to the operator that the strategic route is not shown at the display because the current position of the aircraft deviates from the strategic route by greater than a threshold value. In a particular embodiment, the threshold value can be twice the current value for required navigation performance (RNP) and in other embodiments, this threshold value can have a different value. In any of these embodiments, this indication can highlight to the operator the fact that the current path of the aircraft differs substantially from the planned route and that the operator should refer to a plan view map portion 335b (FIG. 3) to locate the strategic route and the aircraft's current position relative to that route.

Figure 9A:
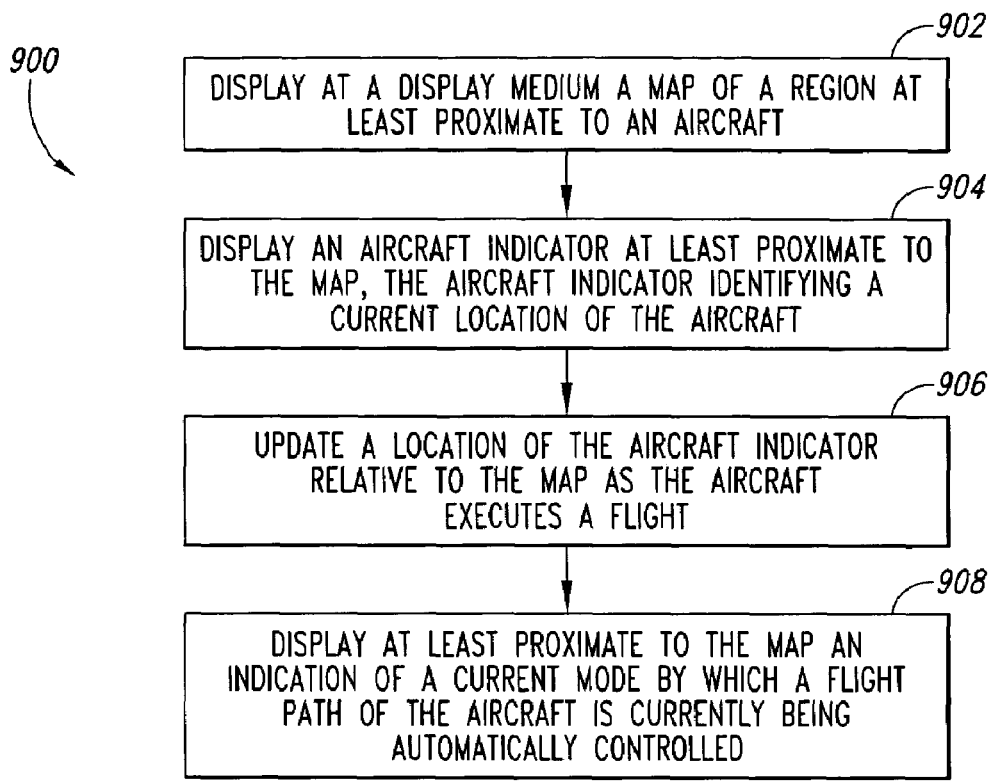
FIGS. 9A-9B are flow diagrams illustrating processes in accordance with an embodiment of the invention for displaying mode information in accordance with an embodiment of the invention.
Figure 10:
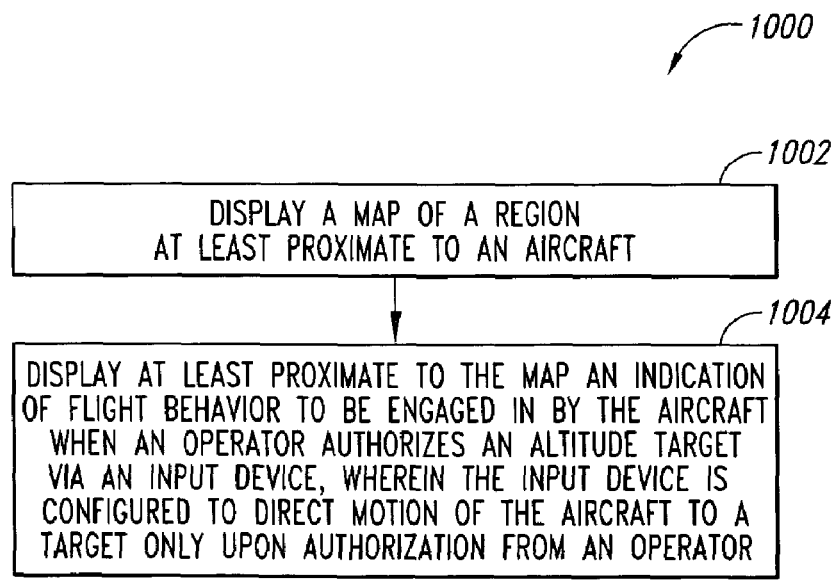
FIG. 10 is a flow diagram illustrating a process for displaying an indication of flight behavior to be engaged in by the aircraft when an operator authorizes an altitude target, in accordance with yet another embodiment of the invention.

FIGS. 9A-10 illustrate flow charts identifying processes for displaying information to aircraft operators in accordance with embodiments of the invention. Beginning with FIG. 9A, a process 900 in accordance with one embodiment can include displaying at a display medium a map of a region at least proximate to an aircraft (process portion 902). As described above, the map can include an elevation view map, a plan view map, or a combination of both. In process portion 904, the process 900 can include displaying an aircraft indicator at least proximate to the map, with the aircraft indicator identifying a current location of the aircraft. The location of the aircraft indicator relative to the map can change as the aircraft executes a flight (process portion 906). The process can further include displaying at least proximate to the map an indication of a current mode by which a flight path of the aircraft is currently being automatically controlled (process portion 908).

Figure 9B:
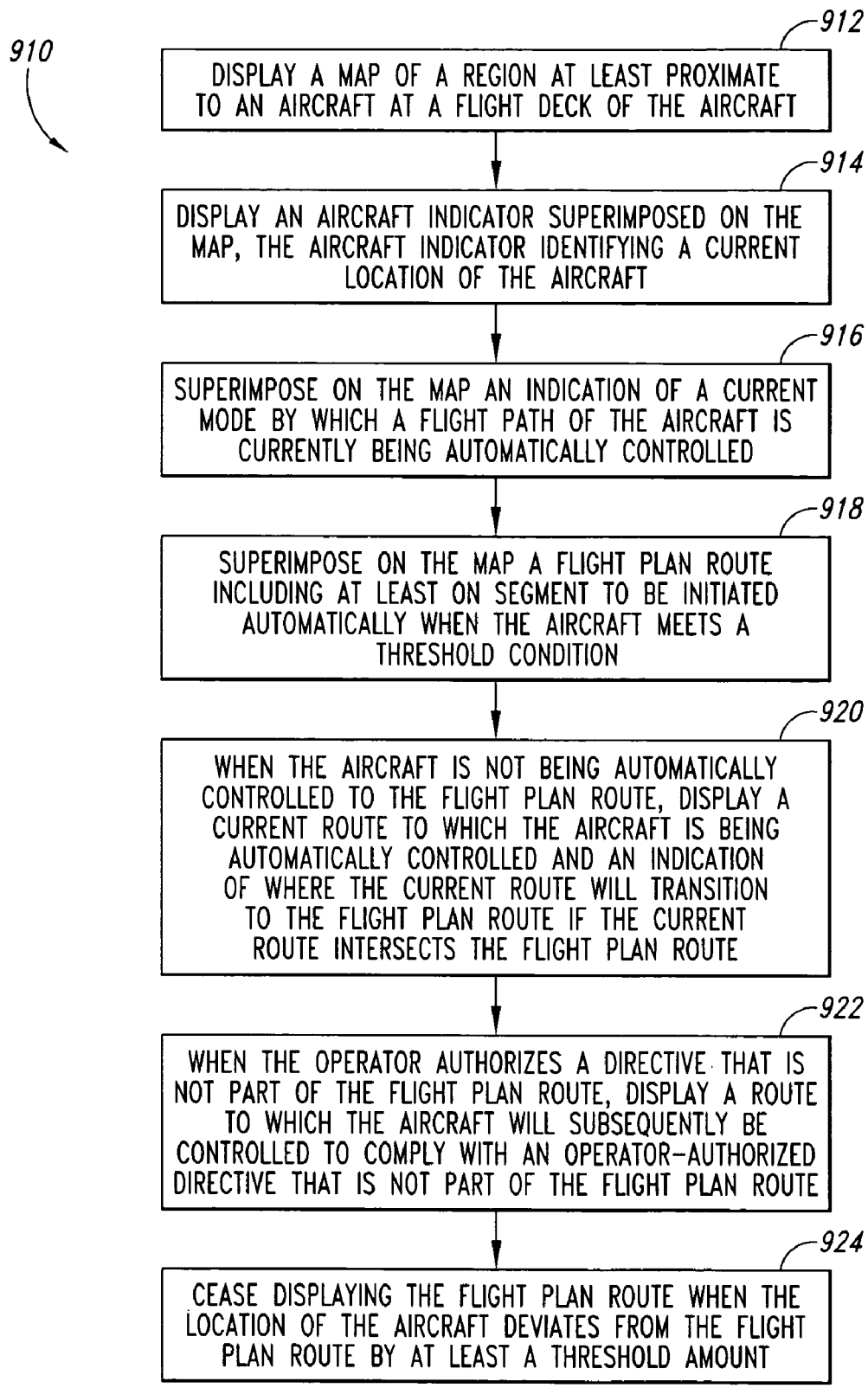

FIG. 9B illustrates a process 910 in accordance with another embodiment of the invention. The process 910 can include displaying a map of a region at least proximate to the aircraft at a flight deck of the aircraft (process portion 912), and displaying an aircraft indicator superimposed on the map, with the aircraft indicator identifying a current location of the aircraft (process portion 914). The process 910 can further include superimposing on the map an indication of a current mode by which a flight path of the aircraft is currently being automatically controlled (process portion 916). In process portion 918, the process 910 can include superimposing on the map a flight plan route including at least one segment to be initiated automatically when the aircraft meets a threshold condition (e.g., a segment controlled by an FMC).

When the aircraft is not being automatically controlled to the flight plan route, the process 910 can include displaying a current route to which the aircraft is being automatically controlled, and displaying an indication of where the current route will transition to the flight plan route if the current route intersects the flight plan route (process portion 920). When the operator authorizes a directive that is not part of the flight plan route (e.g., via an MCP), the process 910 can include displaying a route to which the aircraft will subsequently be controlled to comply with an operator-authorized directive that is not part of the flight plan route (process portion 922). In process portion 924, the system can cease displaying the flight plan route when the location of the aircraft deviates from the flight plan route by at least a threshold amount.

FIG. 10 illustrates a flow chart corresponding to a process 1000 for providing an indication of the effect that will result when an operator authorizes an input via an input device (e.g., an MCP). In a particular aspect of this embodiment, the process 1000 can include displaying a map of a region at least proximate to an aircraft (process portion 1002) and displaying at least proximate to the map an indication of flight behavior to be engaged in by the aircraft when an operator authorizes an altitude target via an input device (process portion 1004). The input device is configured to direct motion of the aircraft to a target only upon authorization from an operator. Accordingly, this method can be carried out with reference to an MCP or similar device that requires operator authorization to implement instructions, as opposed to an FMC or similar device that automatically implements instructions when the aircraft meets a threshold condition.

The systems and methods described above can provide a number of advantages over current systems. For example, aspects of the systems and methods described above can more clearly indicate to the operator whether the aircraft is currently flying toward a target that is received from an FMC flight plan, or toward a target that is received from an MCP. This arrangement can also make it more apparent to the operator how a complex mode is being flown. This feature can be supplemented by aspects of the systems and processes that further include identifying the phase of flight in which the aircraft is currently engaged.

Another feature of systems and methods described above is that they can clearly indicate the targets to which the aircraft is currently being directed and will be directed in a subsequent flight segment. This clear indication can reduce the amount of time required by the pilot to understand which of several available target values the aircraft is currently being controlled to.

Yet another feature of systems and methods described above is that they can provide an indication of where the aircraft will make a transition from one mode to another. Where applicable, the system can also identify a connecting link via which the aircraft can reconnect with an existing flight plan, along with information indicating the severity of the maneuver required by the aircraft to make the reconnection. An advantage of this arrangement is that it can ease the operator's workload by making this information more readily apparent, and can accordingly reduce the time required by the operator to make decisions about upcoming changes in the aircraft's trajectory.

Still another feature of systems and methods described above is that they can identify, via textual messages, the result that will occur if the operator enters a particular input, for example, by pushing an MCP altitude knob. An advantage of this arrangement is that it can reduce the operator's uncertainty about what effect he or she will create when entering such an input and can accordingly result in more efficient and appropriate use of the input device.

From the foregoing, it will be appreciated that specific embodiments of the invention have been described herein for purposes of illustration, but that various modifications may be made without deviating from the spirit and scope of the invention. For example, aspects of the invention described in the context of particular embodiments can be eliminated or combined in other embodiments. Accordingly, the invention is not limited except as by the appended claims.

We claim:

1. A computer-implemented method for presenting aircraft control and navigation information, comprising:
   displaying at a display medium a map of a region at least proximate to an aircraft;
   displaying an aircraft indicator at least proximate to the map, the aircraft indicator identifying a current location of the aircraft;
   updating a location of the aircraft indicator relative to the map as the aircraft executes a flight;
   displaying at least proximate to the map an indication of a current mode by which a flight path of the aircraft is currently being automatically controlled;
   displaying a flight plan route, the flight plan route including at least one segment to be initiated automatically when the aircraft meets a threshold condition;
   when the aircraft is not being automatically controlled to the flight plan route, displaying a current route to which the aircraft is being automatically controlled;
   displaying an indication of where the current route will transition to the flight plan route; and
   displaying an indication of a vertical speed required to make a transition from the current route to the flight plan route.

2. The method of claim 1 wherein displaying a map includes displaying a map at a flight deck of the aircraft during flight.

3. The method of claim 1 wherein displaying an indication of a current mode includes displaying an indication of a current pitch mode.

4. The method of claim 1 wherein displaying an indication of a current mode includes displaying an indication of a current pitch mode, and wherein the method further comprises displaying an indication of an airspeed target at least proximate to the map.

5. The method of claim 4 wherein displaying an indication of an airspeed target includes displaying an indication of an airspeed target provided by a flight plan the flight plan including at least one flight segment to be initiated automatically when the aircraft meets a threshold condition, and wherein displaying the airspeed target includes displaying the airspeed target in a first manner when the aircraft is being controlled to the airspeed target, and displaying the airspeed target in a second manner different than the first manner when the aircraft is not being controlled to the airspeed target.

6. The method of claim 1 wherein displaying a map includes displaying a plan view map of an area over which the aircraft is flying.

7. The method of claim 1 wherein displaying a map includes displaying an elevation view map of altitude as a function of ground distance.

8. The method of claim 1, further comprising displaying a flight plan route, the flight plan route including at least one flight segment to be initiated automatically when the aircraft meets a threshold condition.

9. The method of claim 1, further comprising displaying at least proximate to the map an indication of a subsequent mode by which the aircraft will be subsequently automatically controlled.

10. The method of claim 1, further comprising:
    displaying a route to which the aircraft will subsequently be controlled to comply with an operator-authorized directive that is not part of the flight plan route.

11. The method of claim 1, further comprising:
    ceasing to display the flight plan route when the location of the aircraft deviates from the flight plan route by at least a threshold amount.

12. The method of claim 1, wherein the flight plan route includes:
    a plurality of first flight segments to be initiated automatically when the aircraft meets corresponding threshold conditions, the first flight segments being received from a flight management computer; and wherein the method further comprises:
    superimposing the flight plan route on the map;
    receiving from a mode control panel data corresponding to a second flight segment that is initiated automatically upon authorization from an operator, the second flight segment corresponding to the current route; and
    superimposing the second flight segment on the display of the map.

13. A computer-implemented method for presenting aircraft control and navigation information, comprising:
    displaying a map of a region at least proximate to an aircraft at a flight deck of the aircraft;

displaying an aircraft indicator superimposed on the map, the aircraft indicator identifying a current location of the aircraft;

superimposing on the map an indication of a current mode by which a flight path of the aircraft is currently being automatically controlled;

superimposing on the map a strategic flight plan route including at least one segment to be initiated automatically when the aircraft meets a threshold condition;

when the aircraft is not being automatically controlled to the flight plan route, displaying a current tactical route to which the aircraft is being automatically controlled and displaying an indication of where the current tactical route will transition to the strategic flight plan route if the current tactical route intersects the strategic flight plan route;

displaying an indication of a vertical speed required to make a transition from the current route to the flight plan route;

when the operator authorizes a directive that is not part of the strategic flight plan route, displaying a tactical route to which the aircraft will subsequently be controlled to comply with an operator-authorized directive that is not part of the strategic flight plan route; and ceasing to display the strategic flight plan route when the location of the aircraft deviates from the strategic flight plan route by at least a threshold amount.

14. The method of claim 13 wherein displaying the current tactical route includes displaying the current tactical route in a first manner and wherein displaying the strategic flight plan route includes displaying the strategic flight plan route in a second manner different than the first manner.

15. The method of claim 13, further comprising displaying at least proximate to the map an indication of which phase of flight the aircraft is currently in.

16. A computer-implemented method for presenting aircraft control and navigation information, comprising:
displaying a map of a region at least proximate to an aircraft;
displaying at least proximate to the map an indication of which flight mode the aircraft will enter when an operator authorizes an altitude target via an input device, wherein the input device is configured to direct motion of the aircraft to a target only upon authorization from an operator; and
displaying proximate to the map a textual indicator identifying an effect of authorizing the target.

17. The method of claim 16, further comprising:
displaying an aircraft indicator at least proximate to the map, the aircraft indicator identifying a current location of the aircraft; and
displaying an indication of a current mode by which a flight path of the aircraft is currently being automatically controlled.

18. The method of claim 16 wherein the input device includes an altitude control knob of a mode control panel.

19. A system for presenting aircraft control and navigation information, comprising:
a computer-readable medium having contents capable of performing a method that includes:
displaying at a display medium a map of a region at least proximate to an aircraft;
displaying an aircraft indicator at least proximate to the map, the aircraft indicator identifying a current location of the aircraft;
updating a location of the aircraft indicator relative to the map as the aircraft executes a flight;

displaying at least proximate to the map an indication of a current mode, including a pitch mode, by which a flight path of the aircraft is currently being automatically controlled; and displaying an indication of an airspeed target at least proximate to the map, the airspeed target being provided by a flight plan, the flight plan including at least one flight segment to be initiated automatically when the aircraft meets a threshold condition, and wherein displaying the airspeed target includes displaying the airspeed target in a first manner when the aircraft is being controlled to the airspeed target, and displaying the airspeed target in a second manner different than the first manner when the aircraft is not being controlled to the airspeed target.

20. The system of claim 19 wherein the computer-readable medium forms a portion of a flight guidance computer, and wherein the flight guidance computer includes a first portion configured to receive instructions for flight segments to be automatically initiated upon authorization by an operator and a second portion configured to receive and store instructions for flight segments to be initiated at future times upon meeting corresponding threshold conditions.

21. The system of claim 19 wherein the computer-readable medium forms a portion of a flight guidance computer, and wherein the flight guidance computer includes a first portion configured to receive instructions for flight segments to be automatically initiated upon authorization by an operator and a second portion configured to receive and store instructions for flight segments to be initiated at future times upon meeting corresponding threshold conditions, the first portion including an input device to receive an authorization input from the operator, and wherein the computer-readable medium is capable of displaying at least proximate to the map an indication of which flight mode the aircraft will enter when the operator authorizes an altitude target at the input device.

22. The system of claim 19 wherein the computer-readable medium forms a portion of a flight guidance computer, and wherein the flight guidance computer includes a mode control panel configured to receive instructions for flight segments to be automatically initiated upon authorization by an operator and a flight management system configured to receive and store instructions for flight segments to be initiated at future times upon meeting corresponding threshold conditions.

23. The system of claim 19 wherein the computer-readable medium is configured to display the map at a flight deck of the aircraft during flight.

24. The system of claim 19 wherein the computer-readable medium is configured to display an elevation view map of altitude as a function of ground distance.

25. The system of claim 19 wherein the computer-readable medium is configured to display a flight plan route, the flight plan route including at least one flight segment to be initiated automatically when the aircraft meets a threshold condition.

26. The system of claim 19 wherein the computer-readable medium is configured to display at least proximate to the map an indication of a subsequent mode by which the aircraft will be subsequently automatically controlled.

27. The system of claim 19 wherein the computer-readable medium is configured to:
display a flight plan route, the flight plan route including at least one flight segment to be initiated automatically when the aircraft meets a threshold condition; and when the aircraft is not being automatically controlled to the flight plan route, display a current route to which the aircraft is being automatically controlled.

28. The system of claim 19 wherein the computer-readable medium is configured to:
   display a flight plan route, the flight plan route including at least one segment to be initiated automatically when the aircraft meets a threshold condition;
   when the aircraft is not being automatically controlled to the flight plan route, display a current route to which the aircraft is being automatically controlled; and
   display an indication of where the current route will transition to the flight plan route.

29. The system of claim 19 wherein the computer-readable medium is configured to:
   display a flight plan route, the flight plan route including at least one segment to be initiated automatically when the aircraft meets a threshold condition; and
   display a route to which the aircraft will subsequently be controlled to comply with an operator-authorized directive that is not part of the flight plan route.

30. The system of claim 19 wherein the computer-readable medium is configured to:
   display a flight plan route, the flight plan route including at least one segment to be initiated automatically when the aircraft meets a threshold condition; and
   cease displaying the flight plan route when the location of the aircraft deviates from the flight plan route by at least a threshold amount.

31. The system of claim 19 wherein the computer-readable medium is configured to:
   receive from a flight management computer data corresponding to the locations of a plurality of first flight segments to be initiated automatically when the aircraft meets corresponding threshold conditions;
   superimpose a flight plan route on the map, the flight plan route including at least one of the first flight segments;
   receive from a mode control panel data corresponding to a second flight segment that is initiated automatically upon authorization from an operator; and
   superimpose the second flight segment on the display of the map.

32. A system for presenting aircraft control and navigation information, comprising:
   a flight guidance computer including:
   a first portion configured to receive instructions for flight segments to be automatically initiated upon authorization by an operator, the first portion including an input device to receive an authorization input from the operator;
   a second portion configured to receive and store instructions for flight segments to be initiated at future times upon meeting corresponding threshold conditions; and
   a computer-readable medium having contents capable of:
   displaying a map of a region at least proximate to an aircraft;
   displaying at least proximate to the map an indication of which flight mode the aircraft will enter when the operator authorizes an altitude target at the input device;
   displaying a flight plan route, the flight plan route including at least one segment to be initiated automatically when the aircraft meets a threshold condition;
   when the aircraft is not being automatically controlled to the flight plan route, displaying a current route to which the aircraft is being automatically controlled;
   displaying an indication of where the current route will transition to the flight plan route; and
   displaying an indication of a vertical speed required to make a transition from the current route to the flight plan route.

33. The system of claim 32 wherein the first portion includes a mode control panel, the input device includes an altitude knob of the mode control panel, and the second portion includes a flight management system.

34. A computer-implemented method for presenting aircraft control and navigation information, comprising:
   displaying at a display medium a map of a region at least proximate to an aircraft;
   displaying an aircraft indicator at least proximate to the map, the aircraft indicator identifying a current location of the aircraft;
   updating a location of the aircraft indicator relative to the map as the aircraft executes a flight;
   displaying at least proximate to the map an indication of a current mode by which a flight path of the aircraft is currently being automatically controlled including a pitch mode; and
   displaying an indication of an airspeed target at least proximate to the map, the airspeed target being provided by a flight plan, the flight plan including at least one flight segment to be initiated automatically when the aircraft meets a threshold condition, and wherein displaying the airspeed target includes displaying the airspeed target in a first manner when the aircraft is being controlled to the airspeed target, and displaying the airspeed target in a second manner different than the first manner when the aircraft is not being controlled to the airspeed target.

* * * * *